United States Patent [19]

Braddicks

[11] 3,904,579

[45] Sept. 9, 1975

[54] NOVEL FLOOR-TILE COMPOSITIONS COMPRISING PLASTICIZED VINYL CHLORIDE POLYMERS

[75] Inventor: Robert P. Braddicks, Mt. Vernon, N.Y.

[73] Assignee: Union Carbide Corporation, New York, N.Y.

[22] Filed: Aug. 14, 1974

[21] Appl. No.: 497,254

Related U.S. Application Data

[63] Continuation-in-part of Ser. No. 399,931, Sept. 24, 1973, abandoned, which is a continuation-in-part of Ser. No. 276,908, Aug. 1, 1972, abandoned.

[52] U.S. Cl.... 260/42.46; 260/30.6 R; 260/31.8 M; 260/42.49; 260/897 C; 260/899; 260/998.15
[51] Int. Cl.............. C08f 45/42; C08f 45/40
[58] Field of Search......... 260/42.46, 42.49, 998.15, 260/897 C, 899

[56] References Cited
UNITED STATES PATENTS

| | | | |
|---|---|---|---|
| 3,091,597 | 6/1962 | Henriques | 260/899 X |
| 3,358,054 | 12/1967 | Hardt | 260/897 C X |
| 3,401,129 | 9/1968 | McGinley | 260/899 X |
| 3,435,098 | 3/1969 | Watanabe | 260/899 X |
| 3,592,877 | 7/1971 | Mullins | 260/899 X |

*Primary Examiner*—Lewis T. Jacobs
*Attorney, Agent, or Firm*—R. C. Brown

[57] ABSTRACT

Filled vinyl compositions, useful as surface covering, comprising a well-defined mixture of at least two normally-solid thermoplastic vinyl chloride polymers, e.g., (i) vinyl chloride/vinyl acetate copolymer; vinylidene chloride/vinyl chloride copolymer; vinyl chloride/propylene copolymer; chlorinated polyethylene polymer; low molecular weight vinyl chloride/vinyl $C_2$–$C_4$ alkanoate/$C_2$–$C_4$alkene ramdon terpolymer or a mixture thereof and (ii) vinyl chloride/vinyl acetate/ethylene terpolymer. The inclusion of a thermoplastic oxyalkanoyl polymer, e.g., epsilon-caprolactone homopolymer, with/without an antioxidant, e.g., a hindered phenol, yields compositions having good processing characteristics as well as products exhibiting improved mechanical properties such as impact strength.

73 Claims, No Drawings

NOVEL FLOOR-TILE COMPOSITIONS COMPRISING PLASTICIZED VINYL CHLORIDE POLYMERS

This application is a continuation-in-part of application 399,931 filed Sept. 24, 1973, now abandoned, which was a continuation-in-part of application 276,908 filed Aug. 1, 1972, now abandoned.

This invention relates to novel resinous compositions. In one aspect the invention relates to asbestos-free resinous compositions for use in producing thin sheets having utility as surface coverings.

Resinous composition surface coverings comprising synthetic resinous binder, stabilizers, plasticizers, fillers, and color pigments have come to be widely used as coverings for floor, walls, and the like. A widely used resinous composition is a polymer of a vinyl chloride such as thermoplastic poly(vinyl chloride). Such resins have extremely high wear and stain resistance which makes them excellent for use as surface coverings. It is common practice to add fillers to the composition to decrease the over-all cost. The addition of such fillers in relatively large quantities is detrimental to the physical properties of the composition. As one would expect, therefore, the higher quality products have very little filler, whereas the low cost products for the mass market contain a high proportion of filler. These latter products may contain fillers and pigments in total amounts as high as 80 weight percent of the composition.

So-called vinyl asbestos composition sheet, e.g., tile, is an outgrowth of asphalt composition sheet and, as a result, it has been conventionally formulated with asbestos so that its processing and performance properties would match those of the asphalt composition as closely as possible. Initially, this was essential in order that vinyl asbestos compositions would handle properly on the asphalt composition equipment and production lines, thereby requiring a minimum of equipment modification. With the passage of time processors have succeeded in producing decorative chip stocks and very special base stocks without the inclusion of asbestos. However, most of today's base stock formulations contain asbestos filler to avoid dimensional stability problems and processing problems.

Vinyl composition sheets are prepared by a number of different methods including calendering, pressing, and molding. In a calendering system where the relatively thin vinyl composition sheet has to pass through a number of calender rolls and other operations, the strength of the sheet at the relatively high temperatures necessary for processing is of great importance. The ability of the sheet to adhere to the calender rolls is also a significant factor. Fibrous fillers, especially asbestos, greatly increase the hot strength of a vinyl composition above that which can be obtained with non-fibrous fillers. It has, therefore, become universal practice to utilize asbestos when hot strength is needed in vinyl compositions. Required hot strength or hot tensile strength, as used in this art, is that property of a hot vinyl composition which exhibits the proper amount of viscous flow and melt elasticity so that the composition may be sheeted, calendered, and transported without sporadic ripping, tearing, or excessive elongation during hot processing on the calendering line. Excessive viscous flow causes the vinyl composition to deform easily and to rupture. A deficiency in viscous flow causes it to become excessively dry and results in a tendency to crumble and not form sheets. Excessive melt elasticity contributes boardiness to the vinyl composition causing it to become extremely stiff making normal processing difficult, if not impossible.

Recently, various medical researchers and government officials have suggested that exposure to asbestos products may pose a serious health peril to the general public. In one study conducted in 1971, asbestos was reputedly found in the lungs of each of 28 randomly selected autopsies on New York City residents. Such findings startled the medical world since they showed that even the man on the street, not occupationally exposed, was inhaling asbestos. It is quite understandable that there is serious concern among the various governmental agencies to regulate and restrict the handling of asbestos and its end use application. In fact, legislation to to these ends is pending in many municipalities and cities of the United States. Manufacture of vinyl asbestos composition have thus intensified their efforts to find ways to produce, on a commercial scale, asbestos-free vinyl compositions such as tile.

Unfortunately, attempts to use a filler such as dry ground limestone as the sole filler in "vinyl asbestos-type compositions" have repeatedly been unsuccessful in producing commercial base stocks. Such a composition requires extremely careful handling of the sheet on the calender rolls necessitating relatively slow speeds to prevent any undue tension on the sheet which would cause it to collapse or break apart. Also, it is necessary to convey the sheet when not in contact with the calender rolls. Moreover, such limestone-filled vinyl compositions exhibit excessive fluidity and lack required hot strength for proper calendering on the production lines. Shrinkage or lack of dimensional stability is also a severely troublesome defect in such vinyl composition sheets.

Accordingly, one or more of the following objects will be achieved by the practice of the invention. It is a purpose of this invention to minimize the need for asbestos in vinyl compositions used in making floor coverings. It is an object of the invention to provide novel filled resinous compositions which are essentially free of asbestos and which are commercially useful as surface coverings. It is another object of the invention to provide novel vinyl compositions which are essentially or completely free of asbestos and which have good strength at high temperature processing, good roll adhesion, very low water absorption, and improved light resistance. A further object of the invention is to provide novel non-fibrous filled vinyl compositions sheets which possess the desirable properties of fibrous-filled composition sheets such as good indentation resistance, impact strength, and flexibility while lacking many of its disadvantages. A yet further object of this invention is to provide novel processes for producing vinyl composition sheets. These and other objects will become apparent to one skilled in the art from a consideration of this specification.

In the practice of this invention, it has been found, quite unexpectedly, that vinyl compositions which are essentially free of asbestos can be conveniently processed on existing "asbestos tile" equipment and production linees. These novel compositions exhibit a combination of acceptable processing characteristics while the novel products, useful as surface coverings, are characterized by good indentation resistance, good flexibility, improved light resistance, and very low water sensitivity. In addition, novel vinyl compositions can be prepared containing as much as 85 weight percent, and higher, of pigment and filler, e.g., titanium dioxide and mixtures of relatively coarse and fine limestone. Such highly-filled vinyl compositions possess an obvious economic advantage over conventional vinyl compositions which heretofore have been generally filled with asbestos and pigments to amounts not exceeding about 80 weight percent of the composition.

The excellent processing and mechanical properties of the novel vinyl compositions are attributable to a well-defined mixture of a normally-solid thermoplastic polymer, namely, (i) vinyl chloride/vinyl $C_2$-$C_4$ alkanoate copolymer; vinylidene chloride/vinyl chloride copolymer; vinyl chloride/propylene copolymer; chlorinated polyethylene polymer; low molecular weight vinyl chloride/vinyl $C_2$-$C_4$ alkanoate/$C_2$-$C_4$ alkene random terpolymer or a mixture thereof and (ii) a unique terpolymeric composition, namely vinyl chloride/vinyl $C_2$-$C_4$ alkanoate/$C_2$-$C_4$ alkene terpolymer. The term "normally-solid thermoplastic polymers" in reference to the above described polymers, copolymers and terpolymers is intended to describe those polymers which are normally-solid and thermoplastic at room temperature and which can be processed on existing equipment and production lines for producing conventional asbestos-filled vinyl sheets. Such equipment is generally operated at temperatures in the range of from about 150° to about 300°F.

The terms "non-asbestos" and "essentially free of asbestos" are intended to describe compositions containing from essentially 0% up to an amount which does not significantly influence the physical properties of the final product.

Illustrative normally-solid thermoplastic vinyl chloride/vinyl $C_2$-$C_4$ alkanoate copolymers include vinyl chloride/vinyl acetate copolymer, vinyl chloride/vinyl propionate copolymer, and vinyl chloride/vinyl butyrate copolymer. The polymerized vinyl chloride portion of the copolymer comprises at least about 70 weight percent and the polymerized vinyl $C_2$-$C_4$ alkanoate portion upwards to about 30 weight percent, based on the total weight of the copolymer. Preferably, the copolymer comprises at least about 80 to about 95 weight percent polymerized vinyl chloride and from about 5 to about 20 weight percent polymerized vinyl $C_2$-$C_4$ alkanoate. The preferred copolymer is vinyl chloride/vinyl acetate. Particularly useful copolymers are those which have inherent viscosity values in the range of from about 0.35 to about 0.65, preferably from about 0.4 to 0.6. Unless indicated to the contrary the inherent viscosity values were determined in accordance with ASTM Method D-1243-66 using 0.2 gram of polymer in 100 milliliters of cyclohexanone at 30°C.

Illustrative normally-solid thermoplastic vinylidene chloride/vinyl chloride copolymers are those in which the polymerized vinyl chloride portion of the copolymer comprises at least about 50 weight percent and the vinylidene chloride portion upwards to about 50 weight percent, based on the total weight of the copolymer. Preferably, the copolymer is comprised of from about 50 to about 90 weight percent polymerized vinyl chloride and from about 10 to about 50 weight percent polymerized vinylidene chloride. Suitable are copolymers having an inherent viscosity ranging from about 0.35 to about 0.9. Preferred however are those having an inherent viscosity of from about 0.4 to about 0.6.

Illustrative of the vinyl chloride/propylene copolymers are those in which the polymerized vinyl chloride portion of the copolymer comprises at least about 90 weight percent and the propylene portion upwards from about 4 weight percent to about 10 weight percent. Preferably the copolymer is comprised of from about 90 to about 96 weight percent polymerized vinyl chloride and from about 4 to about 10 percent polymerized propylene. Preferred are polymers having an inherent viscosity ranging from about 0.4 to about 0.7.

Illustrative of the chlorinated polyethylene polymers useful in the practice of this invention are those in which chlorine accounts for at least about 40 percent of the polymer weight. Polymer crystallinity should not exceed about 5 percent. Preferred are polymers having 0 percent crystallinity. The preferred chlorinated polyethylene polymers are also those having a molten viscosity of from about 10,000 to about 30,000 poises at a temperature of 190°C.

Typical of the normally-solid thermoplastic vinyl chloride/vinyl $C_2$-$C_4$ alkanoate/$C_2$-$C_4$ alkene terpolymers which are useful in the invention include, by way of illustration, vinyl chloride/vinyl acetate/ethylene terpolymer, vinyl chloride/vinyl acetate/propylene terpolymer, vinyl chloride/vinyl acetate/butylene terpolymer, vinyl chloride/vinyl propionate/ethylene terpolymer, vinyl chloride/vinyl propionate/propylene terpolymer, vinyl chloride/vinyl propionate/butylene terpolymer, vinyl chloride/vinyl butyrate/ethylene terpolymer, vinyl chloride/vinyl butyrate/propylene terpolymer, and vinyl chloride/vinyl butyrate/butylene terpolymer. The polymerized vinyl chloride portion of the terpolymer comprises the major portion by weight and, in general, desirably comprises at least about 75 weight percent of the terpolymer. The polymerized vinyl $C_2$-$C_4$ alkanoate portion of the terpolymer normally contains less than about 24.5 weight percent whereas the polymerized alkene portion contains at least about 0.5 weight percent. Polymerized vinyl $C_2$-$C_4$ alkanoate represents the major component with respect to the polymerized alkene portion. Highly suitable terpolymers comprise, polymerized therein, from about 80 to about 90 weight percent chloride, from about 9 to about 17 weight percent vinyl $C_2$-$C_4$ alkanoate, and from about 1 to about 3 weight percent ethylene. The preferred terpolymer is vinyl chloride/vinyl acetate/ethylene.

The terpolymers useful in this invention are those which have inherent viscosity values ranging from about 0.4 to about 0.9. The terpolymers characterized as relatively high molecular weight terpolymers which are essential ingredients in this invention are those having an inherent viscosity of least 0.5 and preferably from about 0.5 to about 0.8. These are to be distinguished from the lower molecular weight terpolymers having an inherent viscosity of less than about 0.5, preferably about 0.4 to about 0.5 which are optional ingredients.

The terpolymers useful in the practice of this invention are those prepared by the simultaneous polymerization of the three monomeric ingredients, as distinguished from graft polymers. The expression "terpolymers" as used herein therefore describes polymeric materials produced by the simultaneous reaction of all three monomers to produce a material which includes at least some of all of the monomeric moieties in the polymer backbone in what is believed to be a random distribution.

The preferred compositions of this invention are those including vinyl chloride/vinyl alkanoate copolymer and relatively high molecular weight terpolymer either alone or in combination with one or more of the specified optional polymer binder materials. This combination affords a very satisfactory product in terms of physical properties and can be produced on conventional equipment. Optional resins can be added to these basic ingredients if desired to modify physical properties of the tile product or to modify manufacturing conditions. Compositions which do not include vinyl chloride/vinyl alkanoate copolymer provide useful products but generally require more difficult manufacturing conditions.

In one aspect of the invention, novel non-asbestos filled vinyl compositions can be prepared which exhibit good processing characteristics such as required hot strength and good roll adhesion. Moreover, novel sheet products from such compositions exhibit good impact resistance as well as the aforementioned desirable mechanical and physical properties. These and other results are achieved by incorporating into the novel vinyl compositions a minor amount of a normally-solid thermoplastic oxyalkanoyl polymer. The oxyalkanoyl polymers which are suitable possess a reduced viscosity value of at least about 0.1. In various desirable embodiments, the thermoplastic oxyalkanoyl polymers have a reduced viscosity value of at least about 0.2. The upper value can be high as 10, and greater, but no particular advantage is apparent using thermoplastic oxyalkanoyl polymers which have a reduced viscosity value greater than about 3. The oxyalkanoyl polymers are further characterized in that they contain at least about 50 weight percent of the oxyalkanoyl units $$-O(CH_2)_x \overset{O}{\underset{\|}{C}} -,$$

recurring therein, wherein $x$ is an integer having a value of 2,4 and 5–7, preferably 5. In the practice of highly suitable embodiments of the invention, the thermoplastic oxyalkanoyl polymers contain at least about 60 weight percent, and preferably at least about 80 weight percent, and upwards to about 100 weight percent of the oxycaproyl unit, i.e., $$-O(CH_2)_5 \overset{O}{\underset{\|}{C}} -,$$

recurring therein.

The aforesaid recurring unit is interconnected through the oxy group (—O—) of one unit with a carbonyl group

of a second unit. In other words, the interconnection of such units does not involve the direct bonding of two carbonyl groups,

When the thermoplastic oxyalkanoyl polymer is a homopolymer or essentially a homopolymer, the polymer chain thereof consists essentially of interconnected recurring oxyalkanoyl units. In addition to the recurring oxyalkanoyl unit, the thermoplastic oxyalkanoyl polymer may comprise other moieties or groups therein especially those which intersperse or terminate the polymeric chain thereof as illustrated by the oxyalkylene

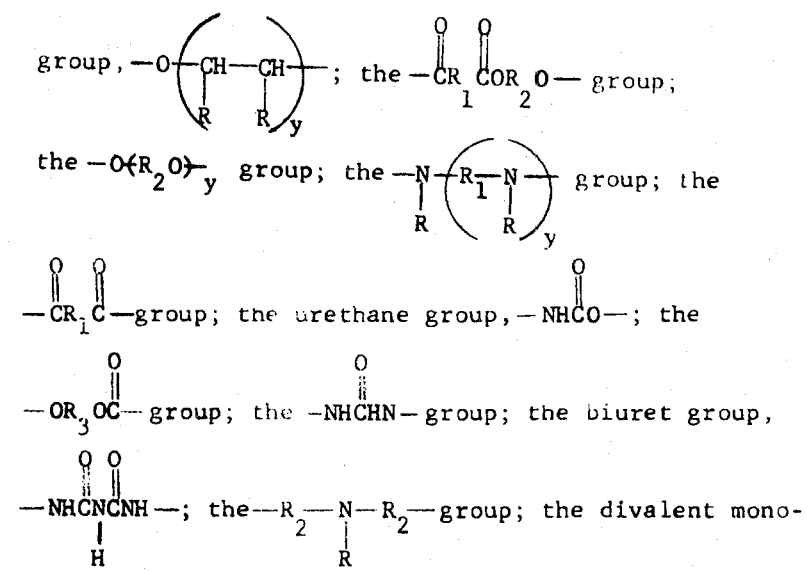

and polyaromatic rings including fused and bridged rings; lower alkyl substituted oxyalkanoyl groups; catalyst residue; the carbonate group,

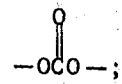

and others. With reference to the aforesaid groups or moieties, the variables R, $R_1$, $R_2$, $R_3$, and $y$ can be illustrated as follows: R' represents hydrogen or lower alkyl; $R_1$ represents a divalent hydrocarbon group; $R_2$ represents a divalent aliphatic hydrocarbon group or a divalent aliphatic oxa-hydrocarbon group; $R_3$ represents a divalent aliphatic hydrocarbon group; and $y$ represents an integer which has a value of at least 1.

The term "lower alkyl", as used herein, represents a monovalent aliphatic hydrocarbon group having 1 to 4 carbon atoms, e.g., methyl, ethyl, propyl, isopropyl, n-butyl, etc. The term "divalent hydrocarbon group", as used herein, includes radicals such as $C_1$–$C_{12}$alkylene, $C_2$–$C_{12}$alkylidene, and $C_6$–$C_{12}$arylene, e.g., methylene, propylene, butylene, hexamethylene, heptamethylene, cyclohexylene, phenylene, napthylene, propylidene, butylidene, etc. The term "divalent aliphatic hydrocarbon group", as used herein, includes $C_2$–$C_{12}$alkylene and $C_2$–$C_{12}$alkylidene. The term "divalent aliphatic oxa-hydrocarbon group", as used herein, can be represented by the empirical formula, —$C_2$—$C_{12}$alkylene(oxy$C_2$–$C_{12}$alkylene)$_{\overline{n}}$. The variable $y$, as used herein, represents an integer having a value of at least 1.

As previously noted, the thermoplastic oxycaproyl polymers which are suitable in the practice of the invention are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of benzene (benzene is preferred although cyclohexanone, chloroform, toluene or other common organic solvent for the polymer may be used) at 30°C.

The thermoplastic oxyalkanoyl polymers can be prepared by various methods. A general procedure involves reacting a large molar excess of the appropriate lactone, e.g., epsilon-caprolactone, zeta-enantholactone, and/or eta-caprylolactone with an organic initiator which contains two active hydrogen groups, e.g., hydroxyl, carboxyl, primary amino, secondary amino, and mixtures thereof, such groups being capable of opening the lactone ring whereby it adds as a linear chain (of recurring oxyalkanoyl units) to the site of the active hydrogen-containing group, at an elevated temperature, preferably in the presence of a catalyst, and for a period of time sufficient to produce the desired polymers. By carefully controlling the purity and molar ratio of lactone reactant to organic initiator, there can be produced "initiated" poly(oxyalkanoyl) polymers whose number average molecular weight can range from several hundred to above 100,000. Organic initiators which can be employed include primary diamines, secondary diamines, mixed primary-secondary diamines, aminoalcohols, diols, dicarboxylic acids, hydroxycarboxylic acids, aminocarboxylic acids, etc. Such organic initiators are voluminously illustrated in the literature, e.g., U.S. Pat. Nos. 3,169,945 and 3,427,346. Catalysts which can be employed include, for instance, stannous octanoate, tetrabutyltitanate, dibutyltin dilaurate, and the like. A temperature in the range of from about 150°C to about 250°C for periods ranging upwards to about 24 hours, and longer, are suitable.

Thermoplastic oxycaproyl polymers can also be prepared by reacting the cyclic ester, e.g., epsiloncaprolactone, and/or the corresponding hydroxy-acid, e.g., 6-hydroxycaproic acid, and/or their oligomers, with a mixture comprising diol and dicarboxylic acid, using a molar excess of diol with relation to the dicarboxylic acid, or alternatively, using a molar excess of dicarboxylic acid with relation to the diol. It is highly desirable that free diol or free dicarboxylic acid not be present at the termination of the polyesterification reaction. The water of esterification which results during the reaction can be removed via conventional techniques. The diols and dicarboxylic acids which are particularly suitable include those illustrated by the formulae HO(R$_2$O)$_n$H and HOOCR$_1$COOH such as ethylene glycol, propylene glycol, diethylene glycol, dipropylene glycol, 1,4-butanediol, 1,5-pentanediol, 1,6-hexanediol, 1,10-decanediol, 1,4-cyclohexanediol, succinic acid, glutaric acid, adipic acid, pimelic acid, suberic acid, azelaic acid, sebacic acid, phthalic acid, and the like.

In the absence of added organic initiator, the thermoplastic oxyalkanoyl polymers can be prepared by polymerizing a lactone reactant, e.g., betapropiolactone, delta-valerolactone, epsilon-caprolactone, etc., in the presence of anionic catalysts such as di-n-butylzinc, tri-n-butylaluminum, diethylmagnesium, aluminum triisopropoxide n-butyllithium, dimethylcadmium, and the like. The reaction is desirably conducted at an elevated temperature, e.g., 100° to 250°C, for periods of time ranging from minutes to several hours, e.g., from about 10 minutes to about 24 hours. The reaction mixture can comprise in addition to the lactone reactant, minor quantities of other polymerizable cyclic monomers such as tetramethylene carbonate, methyl-epsilon-caprolactone, keto-dioxane, etc. The number average molecular weight of the resulting polymeric products which are produced by this exemplified "non-initiated" method are, in general, quite high. For example, products which have number average molecular weights ranging from about 10,000 to several hundred thousands can be prepared. The patent literature, e.g., U.S. Pat. Nos. 3,021,309 to 3,021,317, discusses in detail the preparation of these polymers.

Thermoplastic oxyalkanoyl polymers can also be prepared by polymerizing an admixture of $C_7$–$C_9$ lactone, a vicinal epoxy compound, e.g., ethylene oxide, propylene oxide, butylene oxide, cyclohexene oxide, etc., and an interfacial agent such as a solid, relatively high molecular weight poly(vinyl) stearate) or lauryl methacrylate/vinyl chloride copolymer (reduced viscosity in cyclohexanone of from about 0.3 to about 1.0), in the presence of an inert normally-liquid saturated aliphatic hydrocarbon vehicle such as heptane, using phosphorus pentafluoride as the catalyst therefor, and in the absence of an active hydrogen-containing organic initiator, at an elevated temperature, e.g., about 80°C, and for a period of time sufficient to produce such polymers.

Thermoplastic oxyalkanoyl polymers can also be prepared by reacting a molar excess of a lactone with a polyoxyalkylene diol which has a molecular weight ranging from about 400 to about 20,000 under conditions discussed supra with reference to the initiated poly(oxyalkanoyl) polymers. Illustrative of the polyoxyalkylene diols which are contemplated include the poly(oxyethylene) diols, the poly(oxypropylene) diols, and the poly(oxyethyleneoxypropylene) diols. The resulting polymers can be considered, in effect, to be ABA block polymers in which the A portions represent a polyoxyalkanoyl segment or block and in which the B portion represents a polyoxyalkylene segment or block. The number average molecular weight of these ABA block polymers can range upwards to 50,000, and higher, depending on the molecular weight of the polyoxyalkylene diol reactant and the molar ratio of the lactone reactant to polyoxyalkylene diol reactant employed and consumed in the process. By using mono end-blocked polyalkylene diols such as the monoalkyl ether of polyoxyalkylene diol, the above discussed preparation results in polymers having an AB block configuration.

Oxyalkanoyl polymers can be considered to be "graft" polymers can be prepared by the addition of $C_6$–$C_9$ lactone at the active hydrogen sites, e.g., hydroxyl or amino, which are pendant along the polymeric chain of so-called vinyl polymers. Such vinyl polymers may, for example, be obtained by the copolymerization of ethylene and vinyl acetate, followed by subsequent saponification of the acetate groups to yield polymers which are characterized by a plurality of pendant hydroxyl groups along the polymeric chain thereof. A wide host of ethylenically unsaturated monomers can be employed to prepare the vinyl polymers and include, for example, 2-hydroxyethyl acrylate, 2-hydroxy methacrylate, styrene, acrylonitrile, propylene, vinyl chloride, and the like. The choice of the ethylenically unsaturated monomers are such that the resulting polymer contains a plurality of pendant hydroxyl groups, or groups which can be converted to hydroxyl groups. The addition of the $C_6$–$C_9$ lactone at the active hydrogen site will produce graft polymers of number average molecular weights upwards to approximately 100,000, and higher.

The oxyalkanoyl polymers which have number average molecular weights of, for example, less than 25,000 are characterized by functional end groups. For instance, hydroxyl-terminated polymers can be prepared from a diol initiator and epsiloncaprolactone using molar ratios of lactone to initiator upwards to about 100:1. If desired, these polymers may be reacted with a diisocyanate, e.g., 1,6-hexamethylene diisocyanate, 2,4- and/or 2,6-tolylene diisocyanate, bis(-4(isocyanatophenyl)methane, bis(4-isocyanatocyalohexyl)methane, etc., to extend the polymeric chain, or such hydroxyl-terminated polymers as well as their polyurethane extension products can be reacted with so-called "chain stoppers" such as a monocarboxylic acid or anhydride. As indicated previously, the thermoplastic oxyalkanoyl polymers which are suitable in the practice of the invention have, as its lower limit a reduced viscosity value of at least about 0.1.

The amounts of normally-solid thermoplastic polymers which comprise the total polymer binder in the novel composition are quite important. Desirable results are achieved by using from about 25 to about 65 weight percent binder resin and from about 35 to about 75 weight percent relatively high molecular weight vinyl chloride terpolymer, based on the weight of the total polymer binder. Enhanced processing and mechanical properties in the novel compositions are achieved by incorporating into the recipe from about 0.5 to about 15 weight percent thermoplastic oxyalkanoyl polymer, based on the weight of total polymer binder. In the practice of preferred embodiments of the invention the total polymer binder comprises from about 30 to about 60 weight percent binder resin, from about 40 to about 70 weight percent relatively high molecular weight vinyl chloride terpolymer, and from about one to about 10 weight percent thermoplastic oxyalkanoyl polymer.

A wide range of plasticizers for incorporation into the novel non-asbestos compositions can be employed. The particular plasticizer of choice will be influenced, to a significant extent, on its compatibility with the system, and the properties desired in the plasticized product. Illustrative plasticizers include esters of aliphatic hydric compounds and aliphatic carboxyl compounds such as dibutyl sebacate, dioctyl sebacate, dioctyl adipate, didecyl adipate, dioctyl azelate, triethylene glycol di(2-ethylhexanoate), diethylene glycol dipelargonate, triethylene glycol dicaprylate, and the like; esters of aliphatic alcohols and aromatic acids, or aromatic alcohols and aliphatic acids, or aromatic alcohols and aromatic acids, including dibutyl phthalate, dicapryl phthalate, dioctyl phthalate, dipropylene glycol dibenzoate, butyl benzyl sebacate, butyl benzyl phthalate, dibenzyl sebacate, dibenzyl phthalate, and the like. Other types of plasticizers such as esters of inorganic acids, including tricresyl phosphate, octyl diphenyl phosphate, and the like; alkyd derivatives of rosin; chlorinated paraffine; high molecular weight hydrocarbon condensates; and the like; can also be used. The plasticizer should preferably have a low vapor pressure at the temperatures required to fuse the resin. A vapor pressure of 2 millimeters of mercury or less at 400°F is usually considered satisfactory. The plasticizer is employed in a plasticizing amount which is sufficient to provide the mechanical properties which are desired in the end use application. Normally a satisfactory range of plasticizer, including mixtures thereof, is from about 25 parts by weight, and lower, to about 45 parts by weight, and higher, per 100 parts by weight of total polymer binder.

Small amounts of stabilizers which are incorporated to reduce the effects of degradation by light and heat are usually present in the novel composition. Suitable light stabilizers include epoxidized soya bean oil, epoxidized tallates, wood rosin, phosphites, resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers includes barium-cadmium soaps, barium-cadmium-zinc-soaps, epoxides, sulfides and sulfites of silver, calcium, cadmium, magnesium, cerium, sodium strontium and the like, glycerine, leucine, alanine, o- and p-amino benzoic and sulfanilic acids, hexamethylene tetramine, weak acid radicals including oleates, recinoleates, abietates, salicylates and the like. Normally, the novel composition contains from about 0.5 to about 5 parts by weight of stabilizer per 100 parts by weight of total polymer binder. If desired, small amounts of antioxidants such as the hindered phenols, e.g., di-t-butyl-p-cresol, and lubricants such as stearic acid, waxes, etc., may be incorporated into the novel compositions thereby obtaining further improved milling and calendering characteristics.

A wide variety of fillers can be incorporated into the novel compositions. Such fillers can be of the fibrous and non-fibrous type as illustrated by limestone, whiting, clay, pumice, talc, silica, wood flour, mixtures thereof, and the like. Silicic mineral type fillers, though contemplated and within the scope of the invention, do not represent highly desirable fillers. In the practice of suitable embodiments, non-fibrous type fillers are particularly useful. Limestone represents a preferred filler, especially limestone which comprises a wide spectrum of relatively coarse to fine particle sizes, e.g., those having average particle sizes ranging from about 15 microns to about 275 microns. The amounts of filler in the novel compositions can vary quite widely. The novel composition will normally contain from about 200, and lower, to about 750, and higher, parts by weight of total filler per 100 parts by weight of total polymer binder, and generally, from about 250 to about 500 parts by weight of total per 100 parts by weight of total polymer binder. The proper selection of filler, combination of fillers, and/or the particle size ranges thereof, will depend, to a significant degree, on its composite oil absorption. Various pigments can be used such as titanium dioxide, iron oxides, phthalocyanines, benzidines, and the like.

Although a principal objective of this invention is to achieve an asbestos-free floor tile composition it will be appreciated that minor amounts of asbestos, on the order of 1 to 5%, may be added if desired. Even higher amounts can be used if desired however an increase in asbestos content will normally require a proportionate increase in resin content which may not be desirable for economic reasons.

Preferred aspects of the invention include novel non-asbestos compositions comprising an antioxidant incorporated therein. Novel vinyl compositions comprised of one or more of the aforesaid thermoplastic binder resins, relatively high molecular weight terpolymer and oxyalkanoyl polymer and an antioxidant exhibit processing characteristics at least as good as those obtained under existing and conventional production lines using asbestos-containing recipes. Moreover, the sheeted product, such as floor tile, possesses a combination of useful and outstanding properties as illustrated previously in this specification. These processing advantages and improved mechanical and physical properties of the novel non-asbestos compositions heretofore have not been attainable under existing asbestos tile equipment.

Illustrative antioxidants include the sterically hindered phenols, the arylamines, the thioureas, the thiocarbamates, the thioether esters, and the phosphites or mixtures or adducts thereof. Specific examples are tetrakis[methylene-3-3′,5′-di-tert-butyl-4′-hydroxyphenyl)-propionate]methane, stearyl 3-(3′,5′-di-tert-butyl-4′-hydroxyphenyl)propionate, distearyl 3,5-di-tert-butyl-4-hydroxybenzyl phosphite, 1,1,3-tris(5′-tert-butyl-4′-hydroxy-2′-methylphenyl)butane, 4-methyl-1,-6-di(2′-hydroxy-3′-tert-butyl-5′-methylbenzyl)phenol, 2,4-di(3′-5′-di-tert-butyl-4′-hydroxyphenoxy)-triazine, 2,2′-thiobis(4′-methyl-6′-tert-butylphenol), 4-4′-thiobis(3-methyl-6-tert-butylphenol), 3,5-di-tert-butyl-4-hydroxy- anisole, 2,6,-di-tert-butyl-p-cresol, N-phenylbeta-naphthylamine, N,N′-diphenyl-p-phenylenediamine, 2-ethylhexyldiphenylamine, N,N′-di-beta-naphthyl-p-phenylenediamine, N,N′-di-(2-octyl)-p-phenylenediamine, N,N′-di-3(5-methylheptyl)-p-phenylenediamine, 4,4′-dioctyldiphenylamine, 4-octyldiphenylamine, 4-t-butoxydiphenylamine, trimethylthiourea, 1,3-diethylthiourea, ethylene thiourea, sodium dibutyldithiocarbamate, dilauryl thiodipropionate, distearyl thiodiproionate, the mono-, di- and tri-nonylphenyl phosphites, and the like. Other anti-oxidants include p-cresol-formaldehyde resins; para-tertiary-alkylphenol formaldehyde resins in admixture with amino dithioformates; aliphatic polyepoxides; para-tertiary alkylphenol formaldehyde resins in admixture with mercapto compounds; carboxylic acids such as succinic acid, and the like; substituted oxamides such as oxanalide and the like; amino acids such as glycine and the like; aminopolycarboxylic acids such as ethylenediaminetetraacetic acid, diethylenetriaminepentaacetic acid, hydroxyethylethylenediaminetriacetic acid, nitrilotriacetic acid, hydroxyethyliminodiacetic acid, diaminocyclohexanetetraacetic acid, diaminoethyl ether tetraacetic acid; pentaerythritol; sorbitol; resorcinol; and the like. Small amounts of antioxidants are employed; for example, from about 0.002, and lower, to about 2 weight percent, and higher, of antioxidant, based on the weight of the total recipe. Small amounts of lubricants such as stearic acid, waxes, etc., may also be incorporated into the novel compositions thereby obtaining further improved milling and calendering characteristics.

The novel vinyl compositions are conventionally prepared by mixing the normally-solid thermoplastic polymers (total polymer binder), plasticizer, filler, pigments and stabilizer together at temperatures above the softening point of said polymers which is usually between about 250° and about 375°F. This mixing operation is conventionally carried out in a Banbury mixer or Baker-Perkins type mixer. The mixed composition is then fed to a two-roll mill which converts the resulting fused mixture into a flat sheet suitable for feeding the calenders. The two-roll mill is operated to maintain the temperature of the fused stock. It is conventional practice to maintain a temperature differential between the rolls to cause the sheet to adhere or to follow one of the rolls, e.g., the front roll is normally operated at, for example, about 170° to about 200°F whereas the back roll is normally maintained at about 275° to about 325°F. The milled sheet can be subjected to further various calendering operations to reduce its gauge and to smooth its surface, or the sheet can be converted into regular or irregular granules which can then be mixed with similar granules of contrasting coloration and molded into a sheet. Typical calendering operations for forming vinyl sheets are well-documented in the art; note, for example, U.S. Pat. No. 2,917,781. The sheet produced can be laminated to a backing sheet of resin impregnated felt, fabric or a resinous sheet and can also be cut into tiles or other appropriate shape, depending upon the particular use to which the product is to be put.

The following Examples are illustrative.

In the illustrative Examples hereinafter disclosed, numerical notations following the copolymer or terpolymer designations indicate parts by weight. For example, 86 vinyl chloride/14 vinyl acetate refers to a copolymer containing 86 parts by weight of vinyl chloride and 14 parts by weight of vinyl acetate chemically combined therein.

EXAMPLES 1–2

Examples 1–2 illustrate the processing and mechanical properties of two comparable recipes. The first recipe, designated for convenience as NAT (non-asbestos tile), used limestone as the sole filler and the unique combination of thermoplastic polymers as the polymeric binder, i.e., (i) 86 vinyl chloride/14 vinyl acetate copolymer, inherent viscosity of 0.4, (ii) 88 vinyl chloride/10.5 vinyl acetate/1.5 ethylene terpolymer, inherent viscosity of 0.7, and (iii) epsilon-caprolactone homopolymer, reduced viscosity 0.7; the second recipe designated for convenience as VAT (vinyl asbestos tile), employed asbestos as one of the fillers and used the aforesaid 86 vinyl chloride/14 vinyl acetate copolymer as the polymeric binder. The recipes were blended in a Hobart mixer and then mixed and fused in a Banbury mixer at 350°F until fused and homogeneous. The fused stocks were then banded on an 8 inch two roll mill set at 110° and 140°C on the front and back rolls, respectively. A sheet gauge of approximately 190 mils was removed from the mill and calendered to 125 mils gauge with two successive passes through the calender. Specimens were cut and conditioned at 25°C and 50% relative humidity prior to testing. Methods provided in Federal Test Method Standard No. 501A were used to obtain McBurney hardness values at 77° and 115°F, impact resistances, and volatilities. In addition, mill ratings and Brabender Plasticorder molten flow data were determined. The Brabender employed a No. 6 roller head using a sample charge of 100 grams; bowl temperature was set for 150°C and rpm's at 60. Water absorption and water expansion data were also derived. Values were obtained for both tests after water exposures of 1, 3 and 7 days at room temperature. The absorption values represent weight percent gain after the designated exposures. Expansions are in terms of mils per 8 inch measured across machine direction.

The recipes are set out in Table I infra, performance properties of ⅛-inch gauge sheet are recorded in Table II infra, and tensile data (ASTM Method D-412) are recorded in Table III infra.

TABLE I

| FORMULATION; WT. % | NAT RECIPE | VAT RECIPE |
|---|---|---|
| 7R Asbestos | — | 20 |
| 40 Mesh Limestone | 55.6 | 57 |
| "Atomite" (fine limestone) | 24.7 | — |
| Copolymer[1] | 5.7 | 12.0 |
| Terpolymer[2] | 5.3 | — |
| Wood Rosin | 0.19 | 0.2 |
| "Amoco" 18[3] | 0.98 | 0.7 |
| Ba-Cd Stabilizer | 0.35 | 0.3 |
| DOP[4] | 2.20 | — |
| Butyl Benzyl Phthalate | — | 4.30 |
| EPO[5] | 0.52 | 0.62 |
| White Pigment | 3.76 | 4.0 |
| Stearic Acid | — | 0.08 |
| "Mark" 140[6] | — | 0.80 |
| PCL[7] | 0.70 | — |
| Total | 100 | 100 |

[1]86 Vinyl chloride/14 vinyl acetate copolymer, inherent viscosity of about 0.4.
[2]88 Vinyl chloride/10.5 vinyl acetate/1.5 ethylene terpolymer, inherent viscosity of about 0.7.
[3]Poly(alpha-methylstyrene), average molecular weight of about 800–1000.
[4]Di(2-ethylhexyl) phthalate.
[5]Epoxidized soya bean oil.
[6]Nitrogenous based vinyl asbestos tile stabilizer (dicyandiamide).
[7]Epsilon-caprolactone homopolymer, reduced viscosity of about 0.7.

TABLE II

| PERFORMANCE PROPERTIES (⅛TH INCH GAUGE) | NAT RECIPE | VAT RECIPE |
|---|---|---|
| Milling Properties[1] | | |
| Hot Strength | Good | Good |
| Tack | Fair | Good |
| Plasticity | Acceptable | Normal |
| Brabender Data[2] | | |
| Peak Torque (m-gm) | 4900 | 4900 |
| Equilibrium Torque (m-gm) | 2550 | 2100 |
| Max. Temperature | 170°C | 167°C |
| Impact Resistance[3] | | |
| Average | 10.7 | 6.7 |
| Range | 9–13 | 4–9 |
| McBurney Indentation | | |
| 1 min., 77°F | 8.4 | 7.2 |
| 10 min., 77°F | 12.2 | 9.5 |
| Max. Allowed | 13.0 | 11.5 |
| ½ min., 115°F | 23.8 | 27.6 |
| Water Absorption (Weight % Gain) | | |
| 1 Day | 0.83 | 1.46 |
| 3 Days | 1.59 | 2.11 |
| 7 Days | 2.08 | 2.63 |
| Water Expansion (Mils/8 inch) | | |
| 1 Day | None | 5 |
| 3 Days | 5 | 10 |
| 7 Days | 5 | 30 |
| Light Stability[4] (Fadeometer Hrs.) | >192 | 112 |
| Tile Density (lbs./ft.³) | 2.18 | 2.12 |

[1]These are mill processing properties reflecting roll adhesion, toughness and sheeting qualities.
[2]No. 6 roller head, 60 RPM, 100 gm specimen, 150°C.
[3]Data obtained on 1/16th gauge tile; Federal Test Method Standard No. 501A, average of 3 experiments.
[4]Determined in accordance with ASTM Method E-42-64.

TABLE III

| TENSILE DATA | NAT RECIPE | VAT RECIPE |
|---|---|---|
| 78°F | | |
| Modulus | 6100 | 5300 |
| % Elongation | 14 | 11 |
| Tensile Strength | 795 | 950 |
| 100°F | | |
| Modulus | 4060 | 3725 |
| % Elongation | 21.5 | 22 |
| Tensile Strength | 400 | 372 |
| 125°F | | |
| Modulus | 2020 | 1760 |
| % Elongation | 33 | 38 |
| Tensile Strength | 200 | 160 |
| 150°F | | |
| Modulus | 540 | 700 |
| % Elongation | 46 | 42 |
| Tensile Strength | 88 | 74 |

EXAMPLES 3–8

Six all limestone, non-asbestos filled recipes were prepared, blended, fused, sheeted, and tested as described in Examples 1–2 supra. The data are recorded in Tables IV and V infra.

TABLE IV

| Example* | FORMULATIONS, WT. % | | | | | |
|---|---|---|---|---|---|---|
| | 3 | 4 | 5 | 6 | 7 | 8 |
| Copolymer[1] | 5.7 | 5.7 | — | 11.0 | — | 5.7 |
| Terpolymer[2] | 5.3 | 5.3 | — | — | 11.0 | — |
| PCL[3] | 0.7 | 0.18 | 0.7 | 0.7 | 0.7 | 0.7 |
| PVC[4] | — | — | 11.0 | — | — | 5.3 |
| DOP[5] | 2.2 | 2.62 | 2.2 | 2.2 | 2.2 | 2.2 |

[1]86 Vinyl chloride/14 vinyl acetate copolymer, inherent viscosity of about 0.4.
[2]88 Vinyl chloride/10.5 vinyl acetate/1.5 ethylene terpolymer, inherent viscosity of about 0.7.
[3]Epsilon-caprolactone homopolymer, reduced viscosity of about 0.7.
[4]Poly(vinyl chloride), inherent viscosity of about 0.5.
[5]di(2-ethylhexyl)phthalate.
*Except for monomeric plasticizer (DOP), all other ingredients (filler, pigment, processing aids, etc.) are used in the same amounts shown for the all limestone, non-asbestos filled NAT recipe of Examples 1–2 supra.

TABLE V

| EXAMPLES | PERFORMANCE PROPERTIES | | | | | |
|---|---|---|---|---|---|---|
| | 3 | 4 | 5 | 6 | 7 | 8 |
| Milling Properties | | | | | | |
| Hot Strength | Good | Good | — | Poor | Good | Good |
| Tack | Fair | Good | Bad | Good | Poor | Poor |
| Plasticity | Acceptable | Good | (No Sheet) | Excessive | Very Boardy | Slightly Boardy |
| McBurney Hardness | | | | | | |
| 1 minute at 77°F | 8.4 | 9.3 | — | 8.9 | 8.9 | 8.3 |
| Brabender Molten Flow | | | | | | |
| Peak Torque (m-gm) [1] | 4900 | 5200 | 4600 | 3400 | 4900 | 6000 |
| Equilibrium Torque (m-gm) | 2550 | 2200 | 2450 | 1850 | 2550 | 2250 |
| Max. Temperature °C | 170 | 164 | 170 | 161 | 170 | 168 |
| Impact Resistance [2] | 8, 110 | 7, 8 | — | 1, 2 | 23, 28 | 3, 4 |
| (number of impacts required for failure) | | | | | | |

[1] Meter-gram.
[2] Values determined for duplicate test specimens

With reference to Table V, the data therein reveals that recipes containing all PVC (Example 5), PVC plus copolymer (Example 8), all relatively high molecular weight terpolymer (Example 7), and all copolymer (Example 6) showed sufficient deficiencies to be rejected. The all PVC recipe (No. 5) exhibited very poor milling properties due to poor roll adhesion and board y characteristics which caused considerable difficulty in forming a mill blanket. The all terpolymer recipe (No. 7) gave exceptionally good impact resistance but again poor milling properties due to inferior roll adhesion (tack) causing the stock to wander from the front to rear mill rolls. The recipe employing all copolymer (No. 6) was excessively plastic and lacked hot strength. Recipe (No. 8) utilizing copolymer and homopolymer had inferior processing properties due to poor roll adhesion and its board y characteristic. Lower amounts of PCL in combination with the copolymer and terpolymer, as illustrated in recipes (No. 3 and No. 4) exhibited good processing and performance properties.

EXAMPLES 9-10

Examples 9-10 illustrate the processing and mechanical properties of two comparable recipes. The first recipe, designated for convenience as NAT (non-asbestos tile), used limestone as the sole filler and, as the polymeric binders, a combination of (i) 86 vinyl chloride/14 vinyl acetate copolymer, inherent viscosity of 0.4, and (ii) 88 vinyl chloride/10.5 vinyl acetate/1.5 ethylene terpolymer, inherent viscosity of 0.7; the second recipe designated for convenience as VAT (vinyl asbestos tile), employed asbestos and limestone as the fillers and used the aforesaid 86 vinyl chloride/14 vinyl acetate copolymer as the polymeric binder. The recipes were blended in a Hobart mixer and then mixed and fused in a Banbury mixer at 350°F untile fused and homogeneous. The fused stocks were then banded on an 8 inch two roll mill set at 110° and 140°C on the front and back rolls, respectively. A sheet gauge of approximately 190 mils were removed from the mill and calendered to 125 mils gauge with two successive passes through the calender. Specimens were cut and conditioned at 25°C and 50% relative humidity prior to testing. Methods provided in Federal Test Method Standard No. 501A were used to obtain McBurney hardness values at 77° and 115°F, impact resistances, and volatilities. In addition, mill ratings and Brabender Plasticorder molten flow data were determined. The Brabender employed a No. 6 roller head using a sample charge of 100 grams; bowl temperature was set for 150°C and rpm's at 60. Water absorption and water expansion data were also derived. Values were obtained for both tests after water exposures of 1, 3 and 7 days at room temperature. The absorption values represent weight percent gain after the designated exposures. Expansions are in terms of mils per 8 inch measured across machine direction.

The recipes are set out in Table VI infra and performance properties of ⅛-inch gauge sheet are recorded in Table VII infra.

TABLE VI

| | FORMULATION; WT. % | |
|---|---|---|
| | NAT RECIPE (No PCL) | VAT RECIPE (No PCL) |
| 7R Asbestos | — | 20 |
| 40 Mesh Limestone | 55.6 | 57 |
| "Atomite" (true limestone) | 24.8 | — |
| Copolymer[1] | 5.7 | 12.0 |
| Terpolymer[2] | 5.3 | — |
| Wood Rosin | 0.19 | 0.2 |
| "Amoco" 18[3] | 1.0 | 0.7 |
| Ba-Cd Stabilizer | 0.35 | 0.3 |
| DOP[4] | 2.80 | — |
| Butyl Benzyl Phthalate | — | 4.30 |
| EPO[5] | 0.50 | 0.62 |
| White Pigment | 3.76 | 4.0 |
| Stearic Acid | — | 0.08 |
| "Mark" 140[6] | — | 0.80 |

TABLE VI-continued

| | FORMULATION; WT. % | |
|---|---|---|
| | NAT RECIPE (No PCL) | VAT RECIPE (No PCL) |
| Total | 100 | 100 |

(1) 86 Vinyl chloride/14 vinyl acetate copolymer, inherent viscosity of about 0.4.
(2) 88 Vinyl chloride/10.5 vinyl acetate/1.5 ethylene terpolymer, inherent viscosity of about 0.7.
(3) Poly(alpha-methylstyrene), average molecular weight of about 800–1000.
(4) Di(2-ethylhexyl) phthalate.
(5) Epoxidized soya bean oil.
(6) Nitrogenous based vinyl asbestos tile stabilizer (dicyandiamide).

TABLE VII

| PERFORMANCE PROPERTIES ⅛ INCH GAUGE | | |
|---|---|---|
| | NAT RECIPE (NO PCL) | VAT RECIPE (NO PCL) |
| Milling Properties(1) | | |
| Hot Strength | Satisfactory | Good |
| Tack | Good | Good |
| Plasticity | Acceptable | Normal |
| Brabender Data(2) | | |
| Peak Torque (m-gm) | 3400 | 4900 |
| Equilibrium Torque (m-gm) | 1850 | 2100 |
| Max. Temperature | 161°C | 167°C |
| Impact Resistance(3) | | |
| Average | 5 | 8 |
| McBurney Indentation | | |
| 1 min., 77°F | 8.5 | 7.2 |
| 10 min., 77°F | 12.9 | 9.5 |
| ½ min., 115°F | 21.4 | 27.6 |
| Water Absorption (Weight % Gain) | | |
| 1 Day | 0.8 | 1.5 |
| 3 Days | 1.5 | 2.1 |
| 7 Days | 1.8 | 2.6 |
| Water Expansion (Mils/8 inch) | | |
| 1 Day | 5 | 5 |
| 3 Days | 5 | 10 |
| 7 Days | 5 | 30 |
| Light Stability(4) (Fadeometer Hrs.) | 192 | 112 |

(1) These are mill processing properties reflecting roll adhesion, toughness and sheeting qualities.
(2) No. 6 Roller head, 60 RPM, 100 gm specimen, 150°C.
(3) Data obtained on 1/16th gauge tile; Federal Test Method Standard No. 501A, average of 3 experiments.
(4) Determined in accordance with ASTM Method E-42-64.

EXAMPLES 11–12

Two recipes were prepared and processed in the identical manner as set forth in Examples 1–2 supra. The non-asbestos NAT recipe (Example 11) is practically the same as the NAT recipe of Examples 1–2 with the exception that 0.1 weight percent stearic acid and 0.5 weight percent Ionol (2,6-di-t-butyl-p-cresol) are incorporated therein. The asbestos-containing VAT recipe (Example 12) is the same as the VAT recipe of Examples 1–2.

The milling properties of both recipes are rated as follows: non-asbestos NAT recipe (Example 11) —goood hot strength, good tack, and normal plasticity; asbestos-containing VAT recipe (Example 12)—good hot strength, good tack, and normal plasticity. The Brabender Plasticorder molten flow data of the nonasbestos NAT recipe revealed that the resulting torque-time molten flow curve became normal in that the equilibrium torque value was achieved within a time span generally considered to be within the optimum range for asbestos-containing VAT recipes. Without the 2,6-di-t-butyl-p-cresol antioxidant, the nonasbestos-tile recipe exhibited torque values which did not equilibriate in a normal fashion but whose torque continued to increase with time. The Brabender data was consistent with the observed milling characteristics of the recipes. The non-asbestos NAT recipe (with antioxidant) exhibited no boardiness and generally good milling qualities comparable to the asbestos-containing VAT recipe. Table VIII below records both recipes.

TABLE VIII

| | FORMULATION; WT. % | |
|---|---|---|
| EXAMPLE | NAT RECIPE 11 | VAT RECIPE 12 |
| 7R Asbestos | — | 20 |
| 40 Mesh Limestone | 55.6 | 57 |
| "Atomite" (fine limestone) | 24.1 | — |
| Copolymer (1) | 5.7 | 12.0 |
| Terpolymer (2) | 5.3 | — |
| Wood Rosin | 0.19 | 0.2 |
| "Amoco" 18 (3) | 0.98 | 0.7 |
| Ba-Cd Stabilizer | 0.35 | 0.3 |
| DOP (4) | 2.20 | — |
| Butyl Benzyl Phthalate | — | 4.30 |
| EPO (5) | 0.52 | 0.62 |
| White Pigment | 3.76 | 4.0 |
| Stearic Acid | 0.1 | 0.08 |
| "Mark" 140 (6) | — | 0.80 |
| PCL (7) | 0.70 | — |
| Ionol (8) | 0.50 | — |
| Total | 100 | 100 |

(1) 86 Vinyl chloride/14 vinyl acetate copolymer, inherent viscosity of about 0.4
(2) 88 Vinyl chloride/10.5 vinyl acetate/1.5 ethylene terpolymer, inherent viscosity of about 0.7.
(3) Poly(alpha-methylstyrene), average molecular weight of about 800–1000.
(4) Di(2-ethylhexyl) phthalate.
(5) Epoxidized soya bean oil.
(6) Nitrogenous based vinyl asbestos tile stabilizer (dicyandiamide).
(7) Epsilon-caprolactone homopolymer, reduced viscosity of about 0.7.
(8) 2,6-Di-t-butyl-p-cresol.

EXAMPLES 13–16

Four recipes were prepared (see Table IX) and processed as described in Examples 1 and 2 for comparison purposes. Example 13 is a typical and preferred composition according to this invention. Example 14 is essentially identical to Example 13 except that it does not include the preferred normally-solid oxyalkanoyl polymer.

Example 15 illustrates the use of conventional vinyl resin comprised of a blend of two copolymeric resins in the formulation of non-asbestos tile. Example 16 illustrates the use of a blend of a copolymeric vinyl resin and a terpolymeric vinyl resin of the type used in the present invention, but without solid oxyalkanoyl polymer.

The test results set forth in Table X clearly show that the incorporation of a minor amount of oxyalkanoyl polymer (Example 13) affords a substantial improvement in hot strength which is shown by improved tensile strength and milling qualities of Example 13 as compared to Example 14. Hot tensile strength was increased by approximately 16% along with a substantial increase in Brabender equilibrium tongue.

The drastically reduced Brabender equilibrium tongue values and extremely poor milling properties for Examples 15 and 16 demonstrate the total unsuitability of these formulations for floor tile use. The substantial increase in stress relaxation time also precludes the use of these compositions in non-asbestos tile applications due to a serious lack in dimensional stability. It is considered important to note that the substitution of terpolymer in Example 16 for one of the copplymers of Example 15 produced a dramatic increase in Brabender equilibrium torque and in hot tensile strength even though the terpolymer included only 1.5% ethylene.

EXAMPLES 17-30

Fourteen limestone filled, non-asbestos recipes incorporating varying amounts of: vinylidene chloride/vinyl chloride copolymer; vinyl chloride/propylene copolymer; chlorinated polyethylene polymer; or low molecular weight vinyl chloride/vinyl $C_2$–$C_4$ alkanoate/$C_2$–$C_4$ alkene random terpolymer were prepared, blended, fused, sheeted and tested as described in Examples 1-2 supra. In examples 19, 22 24 and 27 relatively high molecular weight terpolymer was omitted from the recipe to confirm the criticality of this ingredient to better indicate the contribution of the binder resin to the properties of the final product and to processing conditions. Data obtained is recorded in Tables

TABLE IX

| EXAMPLE | FORMULATIONS; PARTS BY WEIGHT | | | |
|---|---|---|---|---|
| | 13 | 14 | 15 | 16 |
| Raw Materials | | | | |
| 40 Mesh Limestone | 2780 | 2780 | 0 | 0 |
| "Atomite" (fine limestone) | 1235 | 1235 | 2388 | 2388 |
| Copolymer [1] | 285 | 285 | 0 | 0 |
| Terpolymer [2] | 265 | 265 | 0 | 575 |
| Copolymer [3] | 0 | 0 | 575 | 0 |
| Copolymer [4] | 0 | 0 | 825 | 825 |
| PCL-700 [5] | 35 | 0 | 0 | 0 |
| Wood Rosin | 9.5 | 9.5 | 0 | 0 |
| "Amoco" 18 [6] | 49 | 47 | 0 | 0 |
| Ba-Cd Stabilizer | 17.5 | 17.5 | 100 | 100 |
| Ionol [7] | 12.5 | 12.5 | 0 | 0 |
| DOP [8] | 110 | 145 | 0 | 0 |
| EPO [9] | 26.5 | 26.5 | 0 | 0 |
| White Pigment TiO$_2$ | 188 | 188 | 500 | 500 |
| "Benzoflex" 988 [10] | 0 | 0 | 600 | 600 |
| Stearic Acid | 0 | 0 | 12.5 | 12.5 |
| TOTAL | 5013 | 5013 | 5000.5 | 5000.5 |

[1] 86 vinyl chloride/14 vinyl acetate copolymer, inherent viscosity of about 0.4
[2] 88 vinyl chloride/10.5 vinyl ethylene, terpolymer, inherent viscosity of about 0.7
[3] 86 vinyl chloride/14 vinyl acetate copolymer, inherent viscosity of about 0.5
[4] 88 vinyl chloride/12 vinyl acetate copolymer, inherent viscosity of about 0.7
[5] Epsilon-caprolactone homopolymer, reduced viscosity of about 0.7
[5] Epsilon-caprolactone homopolymer, reduced viscosity of about 0.7.
[6] Poly(alpha-methylstyrene), average molecular weight of about 800-1000
[7] 2,6-Di-t-butyl-p-cresol
[8] Di(2-ethylhexyl) phthalate.
[9] Epoxidized soya bean oil
[10] Dipropylene glycol dibenzoate

TABLE X

| Example | TILE PERFORMANCE PROPERTIES | | | |
|---|---|---|---|---|
| | 13 | 14 | 15 | 16 |
| Milling Properties [1] | | | | |
| Hot Strength | Good | Fair | Too plastic to rate | Too plastic to rate |
| Tack | Good | Good | Poor | Poor |
| Plasticity | Normal | Normal | Excessive | Excessive |
| Nerve | Minor | Minor | Excessive | Excessive |
| Brabender Melt Flow Data [2] | | | | |
| Equil. Torque (m-gms) | 2650 | 2100 | 900 | 1125 |
| Max. Stock Temp. (°C.) | 180 | 169 | 151 | 155 |
| McBurney Hardness [3] | | | | |
| 1 min. at 77°F | 7.6 | 8.0 | 23.3 | 23.0 |
| Impact Resistance [3] | | | | |
| Average | 8.6 | 7.3 | 30 | 30 |
| Range | 8-10 | 7-8 | — | — |
| Relaxation Time (secs.) [4] | 38 | 38 | 100 | 100 |
| Tensile Strength at 180°F [4] | 44 | 38 | 51 | 82 |
| % Elongation at 180°F | 31 | 32 | 189 | 170 |

[1] mill processing properties reflecting roll adhesion, toughness and sheeting qualities
[2] No. 6 Roller head, 60 RPM, 100 gm Specimen, 150°C.
[3] Federal Spec. Test Method No. 501 A Method No. 3211
[4] Values shown are average results from six replicates.

XI and XII below. In Table XI a dash signifies omission of the indicated ingredient while in Table XII a dash indicates that the test was not preformed on the data was not recorded.

TABLE XI

| Example | \multicolumn{10}{c}{Formulation; Parts by Weight} |
|---|---|---|---|---|---|---|---|---|---|---|
|  | 17 | 18 | 19 | 20 | 21 | 22 | 23 | 24 | 25 | 26 |
| Raw Materials |  |  |  |  |  |  |  |  |  |  |
| 40 Mesh Limestone | 2850 | 2850 | 2606 | 2850 | 2850 | 2850 | 2850 | 2850 | 2850 | 2850 |
| Fine Limestone | 1300 | 1300 | 1188 | 1300 | 1300 | 1300 | 1300 | 1300 | 1300 | 1300 |
| Binder Resin [1] | 221 | 147 | — | 221 | 147 | — | 146.5 | 293 | 221 | 147 |
| Binder Resin [2] | 140 | 280 | 512 | — | — | — | — | — | — | — |
| Binder Resin [2'] | — | — | — | — | — | — | — | — | — | — |
| Binder Resin [3] | — | — | — | 140 | 280 | 560 | — | — | — | — |
| Binder Resin [4] | — | — | — | — | — | — | 146.5 | 267 | — | — |
| Binder Resin [5] | — | — | — | — | — | — | — | — | 140 | 280 |
| Terpolymer [6] | 199 | 133 | — | 199 | 133 | — | 267 | — | 199 | 133 |
| "Amoco" 18 [7] | 47.6 | 47.6 | 43.5 | 47.6 | 47.6 | 47.6 | 47.6 | 47.6 | 47.6 | 47..6 |
| Ba-Cd Stabilizer | 11 | 11 | 10 | 11 | 11 | 11 | 11 | 11 | 11 | 11 |
| Di(2-ethylhexyl)phthalate | 112 | 112 | 102.4 | 112 | 112 | 112 | 112 | 112 | 112 | 112 |
| Wood Rosin | 8 | 8 | 7.3 | 8 | 8 | 8 | 8 | 8 | 8 | 8 |
| White Pigment (TiO$_2$) | 50 | 50 | 45.7 | 50 | 50 | 50 | 50 | 50 | 50 | 50 |
| EPO [8] | 26.2 | 26.2 | 24 | 26.2 | 26.2 | 26.2 | 26.2 | 26.2 | 26.2 | 26.2 |
| PCL-700 [9] | 35.2 | 35.2 | 32.2 | 35.2 | 35.2 | 35.2 | 35.2 | 35.2 | 35.2 | 35.2 |

| Example | 27 | 28 | 29 | 30 |
|---|---|---|---|---|
| Raw Materials |  |  |  |  |
| 40 Mesh Limestone | 2850 | 2850 | 2850 | 2850 |
| Fine Limestone | 1300 | 1300 | 1300 | 1300 |
| Binder Resin [1] | — | 199 | 133 | — |
| Binder Resin [2] | — | — | — | — |
| Binder Resin [2'] | — | 140 | 280 | — |
| Binder Resin [3] | — | — | — | — |
| Binder Resin [4] | — | — | — | 293 |
| Binder Resin [5] | 560 | — | — | — |
| Terpolymer [6] | — | 199 | 133 | 267 |
| "Amoco" 18 [7] | 47.6 | 47.6 | 47.6 | 47.6 |
| Ba-Cd Stabilizer | 11 | 11 | 11 | 11 |
| Di(2-ethylhexyl)phthalate | 112 | 112 | 112 | 112 |
| Wood Rosin | 8 | 8 | 8 | 8 |
| White Pigment (TiO$_2$) | 50 | 50 | 50 | 50 |
| EPO [8] | 26.2 | 26.2 | 26.2 | 26.2 |
| PCL-700 [9] | 35.2 | 35.2 | 35.2 | 35.2 |

Notes:
[1] 86 vinyl chloride/14 vinyl acetate copolymer, inherent viscosity of about 0.4
[2] 60 vinylidene chloride/40 vinyl chloride; inherent viscosity .39–.40
[2'] 93–97 vinylidene chloride/3–7 vinyl chloride; inherent viscosity .83–.86
[3] 96 vinyl chloride/4 propylene; inherent viscosity .57–.63
[4] Dow Chemical MX 2243.35 chlorinated polyethylene; 45% chlorine; 0% relative crystallinity; molten viscosity 2200 poises at 190°C.
[5] 87.2 vinyl chloride/11.7 vinyl acetate/1.1 ethylene, terpolymer, inherent viscosity about 0.5
[6] 88 vinyl chloride/10.5 vinyl acetate/1.5 ethylene, terpolymer, inherent viscosity of about 0.7
[7] Poly(alpha-methylstyrene), average molecular weight of about 800–1000
[8] Epoxidized soya bean oil
[9] Epsilon-caprolactone homopolymer, reduced viscosity of about 0.7.

TABLE XII

| Example | \multicolumn{9}{c}{Experimental Results} |
|---|---|---|---|---|---|---|---|---|---|
|  | 17 | 18 | 19 | 20 | 21 | 22 | 23 | 24 | 25 |
| Banbury |  |  |  |  |  |  |  |  |  |
| Mix Time (mins.) | 5 | 4.5 | 7 | 5 | 5 | 4 | — | — | 6 |
| Kilowatts (Peak) | 8.6 | 8.7 | 7.1 | 7.8 | 7.9 | 8.8 | 8.3 | 8.8 | 7.6 |
| Drop Temperature | 315 | 310 | 270 | 328 | 331 | 330 | 345 | 340 | 325 |
| Mill |  |  |  |  |  |  |  |  |  |
| Hot Strength | Good | Fair | Poor | Good | Good | Good | Poor | Poor | Good |
| Brabender |  |  |  |  |  |  |  |  |  |
| Min. Torque (m-gms) | 2700 | 2470 | 1500 | — | 2920 | — | 3370 | 3110 | — |
| Temperature °C | 178 | 174 | 159 | — | 177 | — | 182 | 181 | — |
| ΔTorque (m-gms)[1] | 680 | — | 730 | — | — | — | 640 | 540 | — |
| Shear Relaxation [2] 1/e (secs.) | 48 | — | 30 | — | — | — | 54 | 54 | — |
| McBurney 1 min. Indent (mils) | 8.5 | 10.4 | 23.5 | 7.2 | 7.1 | 6.7 | 10.0 | 14.0 | 7.6 |
| Average Impacts | 2.3 | 3.6 | Too Soft | 2.3 | 3 | 1.6 | 30 | 27 | 4 |
| Hot Tensile Relaxation [3] (secs.) | — | 9.7 | — | — | 27 | — | 32 | 12 | — |

| Example | 26 | 27 | 28 | 29 | 30 |
|---|---|---|---|---|---|
| Banbury |  |  |  |  |  |
| Mix Time (mins.) | 5 | 4.5 | 7 | 8.5 | 4 |
| Kilowatts (Peak) | 7.8 | 7.7 | 8.6 | 8.0 | 8.0 |

TABLE XII-continued

| Example | \multicolumn{9}{c}{Experimental Results} | | | | | | | | |
|---|---|---|---|---|---|---|---|---|
|  | 17 | 18 | 19 | 20 | 21 | 22 | 23 | 24 | 25 |
| Drop Temperature | 320 | 310 | 345 | 345 | 345 | | | | |
| Mill Hot Strength | Fair | Poor | Good | Poor | Fair | | | | |
| Brabender Min. Torque (m-gms) | 2740 | — | — | 3620 | 3670 | | | | |
| Temperature °C | 182 | — | — | 175 | 182 | | | | |
| ΔTorque (m-gms) [1] | — | — | — | — | 630 | | | | |
| Shear Relaxation [2] 1/e (secs.) | — | — | — | — | 42 | | | | |
| McBurney 1 min. Indent (mils) | 7.6 | 8.6 | 7.2 | 7.8 | 15–15.5 | | | | |
| Average Impacts | 4.6 | 3.6 | 11.3 | 7 | >50 | | | | |
| Hot Tensile Relaxation [3] (secs.) | 19.2 | — | — | ~40 | 18 | | | | |

Notes:
[1] ΔTorque, immediate torque increase caused by allowing specimen to remain at rest one minute followed by continued shearing; used to rate sensitivity of stock to being worked.
[2] Decay rate of Δ torque, also used as measure of composition's sensitivity to being worked.
[3] Time for tensile stress at 180°F to decay to 1/e of initial value (36.8%), used as a measure of tile dimensional stability.

The data recorded above demonstrates the importance of including relatively high molecular weight terpolymer in the recipe as all of the Examples (19, 22, 24 and 27) in which it was totally excluded resulted in a product which was unacceptable and could be produced only by resorting to processing conditions which are equally unacceptable. The remaining recipes yielded products which are acceptable from the standpoint of both product characteristics and processing conditions but which do not appear as desirable on balance as those achieved with recipes employed in the earlier examples. Examples 17–19 reveal the important contribution of the vinylidene chloride/vinyl chloride copolymer to product dimensional stability while Examples 23, 24 and 30 reveal the remarkable contribution of chlorinated polyethylene to impact stability. These data provide the skilled worker in the field with the means to tailor the recipes of this invention by adding varying amounts of binder ingredients to achieve a compromise in product physical properties and in processing conditions best suited to the requirements of a particular application.

I claim:

1. A plasticized solid composition comprising a plasticizer containing a homogeneous mixture of:
   a. normally solid thermoplastic polymeric binder selected from the group consisting of:
   i. vinyl chloride/vinyl $C_2$–$C_4$ alkanoate polymer in which the polymerized vinyl chloride portion thereof comprises at least about 70 weight percent and the polymerized vinyl $C_2$–$C_4$ alkanoate portion thereof comprises up to about 30 weight percent
   ii. vinylidene chloride/vinyl chloride polymer in which the polymerized vinyl chloride portion thereof comprises at least about 50 weight percent and the polymerized vinlylidene chloride portion thereof comprises up to about 50 weight percent
   iii. vinyl chloride/propylene polymer in which the polymerized vinyl chloride portion thereof comprises at least about 90 weight percent and the polymerized polypropylene portion thereof comprises from about 10 to about 4 percent by weight
   iv. chlorinated polyethylene polymer having not greater than 5 percent crystallinity; a molten viscosity of from about 10,000 to 30,000 poises at 190°C and a chlorine content of at least 40 percent by weight
   v. vinyl chloride/vinyl $C_2$–$C_4$ alkanoate/$C_2$–$C_4$ alkene random terpolymer having an inherent viscosity less than about 0.5 in which the polymerized vinyl chloride portion thereof comprises the major proportion by weight
   vi. mixtures of said polymers
   b. normally-solid thermoplastic vinyl chloride/vinyl $C_2$–$C_4$ alkanoate/$C_2$–$C_4$ alkene relatively high molecular weight random terpolymer having an inherent viscosity of from about 0.5 to about 0.9 in which the polymerized vinyl chloride portion thereof comprises the major portion by weight; and
   c. a filler;
wherein the total combined weight of said polymeric binder and said relatively high molecular weight terpolymer is comprised of from about 25 to about 65 weight percent polymeric binder and from about 75 to about 35 weight percent of said terpolymer; and wherein said filler is present in amounts ranging from about 200 to about 750 parts by weight per 100 parts by weight of said polymeric binder and said relatively high molecular weight terpolymer.

2. The composition of claim 1 wherein said terpolymer is vinyl chloride/vinyl acetate/ethylene terpolymer.

3. The composition of claim 1 wherein said polymeric binder is vinyl chloride/vinyl $C_2$–$C_4$ alkanoate copolymer in which the polymerized vinyl chloride portion thereof comprises at least about 70 weight percent and the polymerized vinyl $C_2$–$C_4$ alkanoate portion thereof comprises up to about 30 weight percent.

4. The composition of claim 1 wherein said polymeric binder is vinylidene chloride/vinyl chloride polymer in which the polymerized vinyl chloride portion thereof comprises at least about 50 weight percent and the polymerized vinylidene chloride portion thereof comprises up to about 50 weight percent.

5. The composition of claim 1 wherein said polymeric binder is vinyl chloride/propylene polymer in which the polymerized vinyl chloride portion thereof comprises at least about 90 weight percent and the polymerized polypropylene portion thereof comprises from about 10 percent to about 4 percent by weight.

6. The composition of claim 1 wherein said polymeric binder is chlorinated polyethylene polymer having not greater than 5 percent crystallinity, a molten viscosity of from about 1000 to 3000 poises at 190°C and a chlorine content of at least 40 percent by weight.

7. The composition of claim 3 wherein said copolymer comprises from about 80 to about 95 weight percent polymerized vinyl chloride and from about 20 to about 5 weight percent polymerized vinyl acetate; and wherein said relatively high molecular weight terpolymer comprises at least about 75 weight percent polymerized vinyl chloride, less than about 24.5 weight percent polymerized vinyl acetate, and at least about 0.5 weight percent polymerized ethylene.

8. The composition of claim 7 wherein said terpolymer comprises from about 80 to about 90 weight percent polymerized vinyl chloride, from about 9 to about 17 weight percent polymerized vinyl acetate, and from about 1 to about 3 weight percent polymerized ethylene.

9. The composition of claim 1 wherein said polymeric binder also contains from about 0.5 to about 15 weight percent of a normally-solid thermoplastic oxyalkanoyl polymer having a reduced viscosity value of at least about 0.1 and which is further characterized in that at least about 50 weight percent of said thermoplastic oxyalkanoyl polymer is attributable to recurring oxyalkanoyl units of the formula

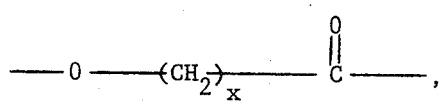

wherein $x$ is an integer having a value of 2 to 7, with the proviso that $x$ does not equal 3.

10. The composition of claim 9 wherein said recurring oxyalkanoyl units have the formula

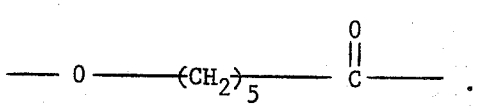

11. The composition of claim 9 wherein said thermoplastic oxyalkanoyl polymer has a reduced viscosity value of at least about 0.2 to about 3 and is further characterized in that at least about 60 weight percent of said polymer is attributable to the recurring oxyalkanoyl unit shown therein.

12. The composition of claim 11 wherein at least about 80 to about 100 weight percent of said thermoplastic oxyalkanoyl polymer is attributable to recurring oxycaproyl units.

13. The composition of claim 12 wherein said polymeric binder is vinyl chloride/vinyl acetate copolymer, wherein said terpolymer is vinyl chloride/vinyl acetate/ethylene terpolymer, and wherein said thermoplastic oxyalkanoyl polymer is poly(epsilon-caprolactone).

14. The composition of claim 13 wherein said copolymer comprises from about 80 to about 95 weight percent polymerized vinyl chloride and from about 20 to about 5 weight percent polymerized vinyl acetate; wherein said terpolymer comprises at least about 75 weight percent polymerized vinyl chloride, less than about 24.5 weight percent polymerized vinyl acetate, and at least about 0.5 weight percent polymerized ethylene.

15. The composition of claim 14 wherein said polymeric binder comprises from about 30 to about 60 weight percent of said copolymer, from about 40 to about 70 weight percent of said terpolymer, and from about one to about 10 weight percent of said thermoplastic oxyalkanoyl polymer.

16. The composition of claim 1 wherein said filler is a non-fibrous filler.

17. The composition of claim 16 wherein said filler is limestone.

18. The composition of claim 1 wherein said homogeneous mixture also comprises a small amount of an antioxidant.

19. The composition of claim 18 wherein said antioxidant is 2,6-di-t-butyl-p-cresol.

20. The composition of claim 1 wherein said vinylidene chloride/vinyl chloride polymer is one in which the polymerized vinyl chloride portion thereof comprises from about 50 to about 90 weight percent and the polymerized vinylidene chloride portion thereof comprises from about 50 to about 10 weight percent, having an inherent viscosity of from about 0.35 to about 0.60.

21. The composition of claim 1 wherein said vinyl chloride/propylene polymer has an inherent viscosity of from about 0.4 to about 0.7 and the polymerized vinyl chloride portion thereof comprises from about 90 to 96 weight percent and the polymerized polypropylene portion thereof comprises from about 10 to about 4 weight percent.

22. A plasticized solid composition comprising a plasticizer containing a homogeneous mixture of:
   a. a mixture of normally solid vinyl chloride/vinyl $C_2$–$C_4$ alkanoate copolymer in which the polymerized vinyl chloride portion thereof comprises at least about 70 weight percent and the polymerized vinyl $C_2$–$C_4$ alkanoate portion thereof comprises up to about 30 weight percent and one or more normally solid thermoplastic polymeric binder resins selected from among:
      i. vinylidene chloride/vinyl chloride polymer in which the polymerized vinyl chloride portion thereof comprises at least about 50 weight percent and the polymerized vinylidene chloride portion thereof comprises up to about 50 weight percent
      ii. vinyl chloride/propylene polymer in which the polymerized vinyl chloride portion thereof comprises at least about 90 weight percent and the polymerized polypropylene portion thereof comprises from about 10 percent to about 4 percent by weight
      iii. chlorinated polyethylene polymer having not greater than 5 percent crystallinity a molten viscosity of from about 1000 to 3000 poises at 190°C and a chlorine content of at least 40 percent by weight and
      iv. vinyl chloride/vinyl $C_2$–$C_4$ alkanoate/$C_2$–$C_4$ alkene random terpolymer having an inherent viscosity less than about 0.5 in which the polymerized vinyl chloride portion thereof comprises the major proportion by weight b. normally-solid thermoplastic vinyl chloride/vinyl $C_2$–$C_4$ alkanoate/$C_2$–$C_4$ alkene relatively high molecular weight random terpolymer having an inherent viscosity of from about 0.5 to about 0.9 in which the polymerized vinyl chloride portion thereof comprises the major portion by weight; and c. a filler;

wherein the total combined weight of said polymeric binder and said relatively high molecular weight terpolymer is comprised of from about 25 to about 65 weight percent polymeric binder and from about 75 to about 35 weight percent of said terpolymer; and wherein said filler is present in amounts ranging from about 200 to about 750 parts by weight per 100 parts by weight of said polymeric binder and said relatively high molecular weight terpolymer.

23. The composition of claim 22 wherein said terpolymer is vinyl chloride/vinyl acetate/ethylene terpolymer.

24. The composition of claim 22 wherein said polymeric binder is vinylidene chloride/vinyl chloride polymer in which the polymerized vinyl chloride portion thereof comprises at least about 50 weight percent and the polymerized vinylidene chloride portion thereof comprises up to about 50 weight percent.

25. The composition of claim 22 wherein said polymeric binder is vinyl chloride/propylene polymer in which the polymerized vinyl chloride portion thereof comprises at least about 90 weight percent and the polymerized polypropylene portion thereof comprises from about 10 percent to about 4 percent by weight.

26. The composition of claim 22 wherein said polymeric binder is chlorinated polyethylene polymer having not greater than 5 percent crystallinity, a molten viscosity of from about 1000 to 3000 poises at 190°C and a chlorine content of at least 40 percent by weight.

27. The composition of claim 22 wherein said copolymer comprises from about 80 to about 95 weight percent polymerized vinyl chloride and from about 20 to about 5 weight percent polymerized vinyl acetate; and wherein said relatively high molecular weight terpolymer comprises at least about 75 weight percent polymerized vinyl chloride, less than about 24.5 weight percent polymerized vinyl acetate, and at least about 0.5 weight percent polymerized ethylene.

28. The composition of claim 27 wherein said terpolymer comprises from about 80 to about 90 weight percent polymerized vinyl chloride, from about 9 to about 17 weight percent polymerized vinyl acetate, and from about 1 to about 3 weight percent polymerized ethylene.

29. The composition of claim 22 wherein said polymeric binder also contains from about 0.5 to about 15 weight percent of a normally-solid thermoplastic oxyalkanoyl polymer having a reduced viscosity value of at least about 0.1 and which is further characterized in that at least about 50 weight percent of said thermoplastic oxyalkanoyl polymer is attributable to recurring oxyalkanoyl units of the formula

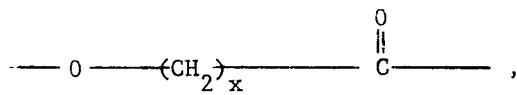

wherein $x$ is an integer having a value of 2 to 7, with the proviso that $x$ does not equal 3.

30. The composition of claim 29 wherein said recurring oxyalkanoyl units have the formula

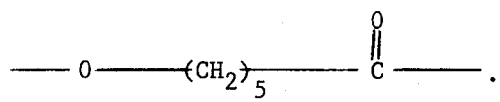

31. The composition of claim 29 wherein said thermoplastic oxyalkanoyl polymer has a reduced viscosity value of at least about 0.2 to about 3 and is further characterized in that at least about 60 weight percent of said polymer is attributable to the recurring oxyalkanoyl unit shown therein.

32. The composition of claim 31 wherein at least about 80 to about 100 weight percent of said thermoplastic oxyalkanoyl polymer is attributable to recurring oxycaproyl units.

33. The composition of claim 22 wherein said filler is a non-fibrous filler.

34. The composition of claim 33 wherein said filler is limestone.

35. A plasticized solid composition comprising a plasticizer containing a homogeneous mixture of:

a. polymeric binder comprising (i) normally-solid thermoplastic vinyl chloride/vinyl $C_2$–$C_4$ alkanoate copolymer in which the polymerized vinyl chloride portion thereof comprises at least about 70 weight percent and the polymerized vinyl $C_2$–$C_4$ alkanoate portion thereof comprises up to about 30 weight percent; and (ii) normally-solid thermoplastic vinyl chloride/vinyl $C_2$–$C_4$ alkanoate/$C_2$–$C_4$ alkene random terpolymer in which the polymerized vinyl chloride portion thereof comprises the major portion by weight; and b. a filler;

c. said polymeric binder comprising from about 25 to about 65 weight percent of said copolymer and from about 35 to about 75 weight percent of said terpolymer; and d. said filler being employed in amounts ranging from about 200 to about 750 parts by weight per 100 parts by weight of said polymeric binder.

36. The composition of claim 35 wherein said terpolymer is vinyl chloride/vinyl acetate/ethylene terpolymer and wherein said copolymer is vinyl chloride/vinyl acetate.

37. The composition of claim 36 wherein said copolymer comprises from about 80 to about 95 weight percent polymerized vinyl chloride and from about 20 to about 5 weight percent polymerized vinyl acetate; and wherein said terpolymer comprises at least about 75 weight percent polymerized vinyl chloride, less than about 24.5 weight percent polymerized vinyl acetate, and at least about 0.5 weight percent polymerized ethylene.

38. The composition of claim 37 wherein said terpolymer comprises from about 80 to about 90 weight percent polymerized vinyl chloride, from about 9 to about 17 weight percent polymerized vinyl acetate, and from about 1 to about 3 weight percent polymerized ethylene.

39. The composition of claim 35 wherein said polymeric binder also contains from about 0.5 to about 15 weight percent of a normally-solid thermoplastic oxyalkanoyl polymer having a reduced viscosity value of at least about 0.1 and which is further characterized in that at least about 50 weight percent of said thermoplastic oxyalkanoyl polymer is attributable to recurring oxyalkanoyl units of the formula

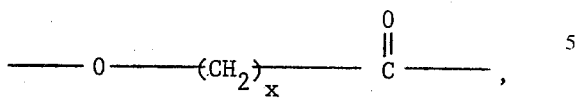

wherein $x$ is an integer having a value of 2 to 7, with the proviso that $x$ does not equal 3.

40. The composition of claim 39 wherein said recurring oxyalkanoyl units have the formula

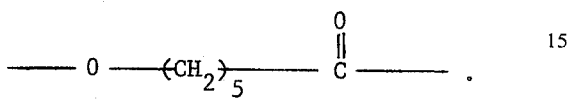

41. The composition of claim 39 wherein said thermoplastic oxyalkanoyl polymer has a reduced viscosity value of at least about 0.2 to about 3 and is further characterized in that at least about 60 weight percent of said polymer is attributable to the recurring oxyalkanoyl unit shown therein.

42. The composition of claim 41 wherein at least about 80 to about 100 weight percent of said thermoplastic oxyalkanoyl polymer is attributable to recurring oxycaproyl units.

43. The composition of claim 42 wherein said copolymer is vinyl chloride/vinyl acetate copolymer, wherein said terpolymer is vinyl chloride/vinyl acetate/ethylene terpolymer, and wherein said thermoplastic oxyalkanoyl polymer is poly(epsilon-caprolactone).

44. The composition of claim 43 wherein said copolymer comprises from about 80 to about 95 weight percent polymerized vinyl chloride and from about 20 to about 5 weight percent polymerized vinyl acetate; wherein said terpolymer comprises at least about 75 weight percent polymerized vinyl chloride, less than about 24.5 weight percent polymerized vinyl acetate, and at least about 0.5 weight percent polymerized ethylene.

45. The composition of claim 44 wherein said polymeric binder comprises from about 30 to about 60 weight percent of said copolymer, from about 40 to about 70 weight percent of said terpolymer, and from about one to about 10 weight percent of said thermoplastic oxyalkanoyl polymer.

46. The composition of claim 35 wherein said filler is a non-fibrous filler.

47. The composition of claim 46 wherein said filler is limestone.

48. The composition of claim 37 wherein said filler is a non-fibrous filler.

49. The composition of claim 48 wherein said filler is limestone.

50. The composition of claim 35 wherein said homogeneous mixture also comprises a small amount of an antioxidant.

51. The composition of claim 50 wherein said antioxidant is 2,6-di-t-butyl-p-cresol.

52. The composition of claim 37 wherein said homogeneous mixture also comprises a small amount of an antioxidant.

53. The composition of claim 52 wherein said antioxidant is 2,6-di-t-butyl-p-cresol.

54. As an article of manufacture, plasticized floor tile having very low water absorption, good light resistance, and good indentation resistance and which is manufactured from a processible mixture comprising a homogeneous mixture of:
a. normally solid thermoplastic polymeric binder selected from the group consisting of:
  i. vinyl chloride/vinyl $C_2$–$C_4$ alkanoate polymer in which the polymerized vinyl chloride portion thereof comprises at least about 70 weight percent and the polymerized vinyl $C_2$–$C_4$ alkanoate portion thereof comprises up to about 30 weight percent.
  ii. vinylidene chloride/vinyl chloride polymer in which the polymerized vinyl chloride portion thereof comprises at least about 50 weight percent and the polymerized vinylidene chloride portion thereof comprises up to about 50 weight percent
  iii. vinyl chloride/propylene polymer in which the polymerized vinyl chloride portion thereof comprises at least about 90 weight percent and the polymerized polypropylene portion thereof comprises from about 10 percent to about 4 percent by weight
  iv. chlorinated polyethylene polymer having not greater than 5 percent crystallinity a molten viscosity of from about 1000 to 3000 poises at 190°C and a chlorine content of at least 40 percent by weight
  v. vinyl chloride/vinyl $C_2$–$C_4$ alkanoate/$C_2$–$C_4$ alkene random terpolymer having an inherent viscosity less than about 0.5 in which the polymerized vinyl chloride portion thereof comprises the major proportion by weight
  vi. mixtures of said polymers
b. normally-solid thermoplastic vinyl chloride/vinyl $C_2$–$C_4$alkanoate/$C_2$–$C_4$alkene relatively high molecular weight random terpolymer having an inherent viscosity of from about 0.5 to about 0.9 in which the polymerized vinyl chloride portion thereof comprises the major portion by weight; and
c. a filler; wherein the total combined weight of said polymeric binder and said relatively high molecular weight terpolymer is comprised of from about 25 to about 65 weight percent polymeric binder and from about 75 to about 35 weight percent of said terpolymer; and wherein said filler is present in amounts ranging from about 200 to about 750 parts by weight per 100 parts by weight of said polymeric binder and said relatively high molecular weight terpolymer.

55. The article of manufacture of claim 54 wherein said homogeneous mixture also contains from about 0.5 to about 15 weight percent of a normally solid thermoplastic oxyalkanoyl polymer having a reduced viscosity value of at least about 0.1 and which is further characterized in that at least about 50 weight percent of said thermoplastic oxyalkanoyl polymer is attributable to recurring oxyalkanoyl units of the formula

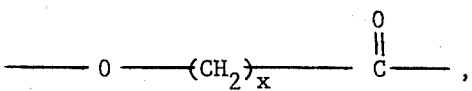

wherein $x$ is an integer having a value of 2 to 7, with the proviso that $x$ does not equal 3.

56. The article of manufacture of claim 54 wherein said filler is a non-fibrous filler.

57. As an article of manufacture, plasticized floor tile having very low water absorption, good light resistance, and good indentation resistance and which is manufactured from a processible homogeneous mixture comprising:
   a. a mixture of normally solid vinyl chloride/vinyl $C_2$–$C_4$ alkanoate polymer in which the polymerized vinyl chloride portion thereof comprises at least about 70 weight percent and the polymerized vinyl $C_2$–$C_4$ alkanoate portion thereof comprises up to about 30 weight percent and one or more normally solid thermoplastic polymeric binder resins selected from among:
      i. vinylidene chloride/vinyl chloride polymer in which the polymerized vinyl chloride portion thereof comprises at least about 50 weight percent and the polymerized vinylidene chloride portion thereof comprises up to about 50 weight percent
      ii. vinyl chloride/propylene polymer in which the polymerized vinyl chloride portion thereof comprises at least about 90 weight percent and the polymerized polypropylene portion thereof comprises from about 10 percent to about 4 percent by weight
      iii. chlorinated polyethylene polymer having not greater than 5 percent crystallinity a molten viscosity of from about 10,000 to 30,000 poises at 190°C and a chlorine content of at least 40 percent by weight and
      iv. vinyl chloride/vinyl $C_2$–$C_4$ alkanoate/$C_2$–$C_4$ alkene random terpolymer having an inherent viscosity less than about 0.5 in which the polymerized vinyl chloride portion thereof comprises the major proportion by weight
   b. normally-solid thermoplastic vinyl chloride/vinyl $C_2$–$C_4$alkanoate/$C_2$–$C_4$alkene relatively high molecular weight random terpolymer having an inherent viscosity of from about 0.5 to about 0.9 in which the polymerized vinyl chloride portion thereof comprises the major portion by weight; and
   c. a filler; wherein the total combined weight of said polymeric binder and said relatively high molecular weight terpolymer is comprised of from about 25 to about 65 weight percent polymeric binder and from about 75 to about 35 weight percent of said terpolymer; and wherein said filler is present in amounts ranging from about 200 to about 750 parts by weight per 100 parts by weight of said polymeric binder and said relatively high molecular weight terpolymer.

58. The article of manufacture of claim 57 wherein said homogeneous mixture also contains from about 0.5 to about 15 weight percent of a normally solid thermoplastic oxyalkanoyl polymer having a reduced viscosity value of at least about 0.1 and which is further characterized in that at least about 50 weight percent of said thermoplastic oxyalkanoyl polymer is attributable to recurring oxyalkanoyl units of the formula

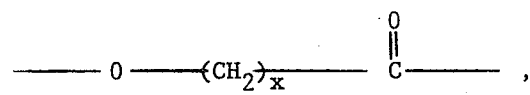

wherein $x$ is an integer having a value of 2 to 7, with the proviso that $x$ does not equal 3.

59. The article of manufacture of claim 57 wherein said filler is a non-fibrous filler.

60. As an article of manufacture, plasticized floor tile having very low water absorption, good light resistance, and good indentation resistance and which is manufactured from a processible mixture comprising:
   a. polymeric binder comprising (i) normally-solid thermoplastic vinyl chloride/vinyl $C_2$–$C_4$alkanoate copolymer in which the polymerized vinyl chloride portion thereof comprises at least about 70 weight percent and the polymerized vinyl $C_2$–$C_4$alkanoate portion thereof comprises up to about 30 weight percent; and (ii) normally-solid thermoplastic vinyl chloride/vinyl $C_2$–$C_4$alkanoate/$C_2$–$C_4$alkene terpolymer in which the polymerized vinyl chloride portion thereof comprises the major portion by weight; and
   b. a filler;
   c. said polymeric binder comprising from about 25 to about 65 weight percent of said copolymer, and from about 35 to about 75 weight percent of said terpolymer; and
   d. said filler being employed in amounts ranging from about 200 to about 750 parts by weight per 100 parts by weight of said polymeric binder.

61. The article of manufacture of claim 60 wherein said polymeric binder also contains from about 0.5 to about 15 weight percent of a normally solid thermoplastic oxyalkanoyl polymer having a reduced viscosity value of at least about 0.1 and which is further characterized in that at least about 50 weight percent of said thermoplastic oxyalkanoyl polymer is attributable to recurring oxyalkanoyl units of the formula

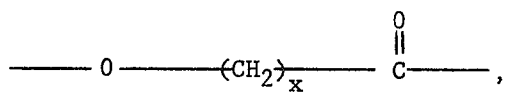

wherein $x$ is an integer having a value of 2 to 7, with the proviso that $x$ does not equal 3.

62. The article of manufacture of claim 61 wherein said thermoplastic oxyalkanoyl polymer has a reduced viscosity value of at least about 0.2 to about 3 and is further characterized in that at least about 60 weight percent of said polymer is attributable to recurring oxycaproyl units; wherein said copolymer is vinyl chloride/vinyl acetate; and wherein said terpolymer is vinyl chloride/vinyl acetate/ethylene terpolymer.

63. The article of manufacture of claim 62 wherein said polymeric binder comprises from about 30 to about 60 weight percent of said copolymer, from about 40 to about 70 weight percent of said terpolymer, and from about one to about 10 weight percent of said thermoplastic oxyalkanoyl polymer.

64. The article of manufacture of claim 63 wherein said filler is a non-fibrous filler.

65. The article of manufacture of claim 63 wherein said mixture also comprises a small amount of an antioxidant.

66. The article of manufacture of claim 65 wherein said antioxidant is 2,6-di-t-butyl-p-cresol.

67. A process for producing non-asbestos containing plasticized vinyl sheet using equipment adaptable for producing asbestos-containing sheet which comprises forming a homogeneous mixture at a temperature of from about 250° to about 375°F which comprises:

a. normally solid thermoplastic polymeric binder selected from the group consisting of:
  i. vinyl chloride/vinyl $C_2$–$C_4$ alkanoate polymer in which the polymerized vinyl chloride portion thereof comprises at least about 70 weight percent and the polymerized vinyl $C_2$–$C_4$ alkanoate portion thereof comprises up to about 30 weight percent
  ii. vinylidene chloride/vinyl chloride polymer in which the polymerized vinyl chloride portion thereof comprises at least about 50 weight percent and the polymerized vinylidene chloride portion thereof comprises up to about 50 weight percent
  iii. vinyl chloride/propylene polymer in which the polymerized vinyl chloride portion thereof comprises at least about 90 weight percent and the polymerized polypropylene portion thereof comprises from about 10 percent to about 4 percent by weight
  iv. chlorinated polyethylene polymer having not greater than 5 percent crystallinity a molten viscosity of from about 1000 to 3000 poises at 190°C and a chlorine content of at least 40 percent by weight
  v. vinyl chloride/vinyl $C_2$–$C_4$ alkanoate/$C_2$–$C_4$ alkene random terpolymer having an inherent viscosity less than about 0.5 in which the polymerized vinyl chloride portion thereof comprises the major proportion by weight
  vi. mixtures of said polymers
b. normally-solid thermoplastic vinyl chloride/vinyl $C_2$–$C_4$alkanoate/$C_2$–$C_4$alkene relatively high molecular weight terpolymer having an inherent viscosity of from about 0.5 to about 0.9 in which the polymerized vinyl chloride portion thereof comprises the major portion by weight;
c. a filler; and
d. a plasticizer;

wherein the total combined weight of said polymeric binder and said relatively high molecular weight terpolymer is comprised of from about 25 to about 65 weight percent polymeric binder and from about 75 to about 35 weight percent of said terpolymer; and wherein said filler is present in amounts ranging from about 200 to about 750 parts by weight per 100 parts by weight of said polymeric binder and said relatively high molecular weight terpolymer, and thereafter milling and calendering said homogeneous mixture into fused plasticized vinyl sheets.

68. The process of claim 67 wherein said homogeneous mixture also contains from about 0.5 to about 15 weight percent of a normally-solid thermoplastic alkanoyl polymer having a reduced viscosity value of at least about 0.1 and which is further characterized in that at least about 50 weight percent of said thermoplastic oxyalkanoyl polymer is attributable to recurring oxyalkanoyl units of the formula

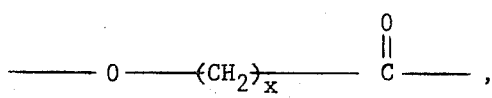

wherein $x$ is an integer having a value of 2 to 7, with the proviso that $x$ does not equal 3.

69. A process for producing non-asbestos containing plasticized vinyl sheet using equipment adaptable for producing asbestos-containing sheet which comprises forming a homogeneous mixture at a temperature of from about 250° to about 375°F which comprises:

a. a mixture of normally solid vinyl chloride/vinyl $C_2$–$C_4$ alkanoate copolymer in which the polymerized vinyl chloride portion thereof comprises at least about 70 weight percent and the polymerized vinyl $C_2$–$C_4$ alkanoate portion thereof comprises up to about 30 weight percent and one or more normally solid thermoplastic polymeric binder resins selected from among:
  i. vinylidene chloride/vinyl chloride polymer in which the polymerized vinyl chloride portion thereof comprises at least about 50 weight percent and the polymerized vinylidene chloride portion thereof comprises up to about 50 weight percent
  ii. vinyl chloride/propylene polymer in which the polymerized vinyl chloride portion thereof comprises at least about 90 weight percent and the polymerized polypropylene portion thereof comprises from about 10 percent to about 4 percent by weight
  iii. chlorinated polyethylene polymer having not greater than 5 percent crystallinity a molten viscosity of from about 10,000 to 30,000 poises at 190°C and a chlorine content of at least 40 percent by weight and
  iv. vinyl chloride/vinyl $C_2$–$C_4$ alkanoate/$C_2$–$C_4$ alkene random terpolymer having an inherent viscosity less than about 0.5 in which the polymerized vinyl chloride portion thereof comprises the major proportion by weight
b. normally-solid thermoplastic vinyl chloride/vinyl $C_2$–$C_4$alkanoate/$C_2$–$C_4$ alkene relatively high molecular weight random terpolymer having an inherent viscosity of from about 0.5 to about 0.9 in which the polymerized vinyl chloride portion thereof comprises the major portion by weight;
c. a filler; and
d. a plasticizer;

wherein the total combined weight of said polymeric binder and said relatively high molecular weight terpolymer is comprised of from about 25 to about 65 weight percent polymeric binder and from about 75 to about 35 weight percent of said terpolymer; and wherein said filler is present in amounts ranging from about 200 to about 750 parts by weight per 100 parts by weight of said polymeric binder and said relatively high molecular weight terpolymer, and thereafter milling and calendering said homogeneous mixture into fused plasticized vinyl sheets.

70. The process of claim 69 wherein said homogeneous mixture also contains from about 0.5 to about 15 weight percent of a normally-solid thermoplastic alkanoyl polymer having a reduced viscosity value of at least about 0.1 and which is further characterized in that at least about 50 weight percent of said thermoplastic oxyalkanoyl polymer is attributable to recurring oxyalkanoyl units of the formula

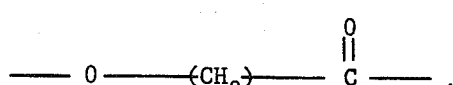

wherein $x$ is an integer having a value of 2 to 7, with the proviso that $x$ does not equal 3.

71. A process for producing non-asbestos containing plasticized vinyl sheet using equipment adaptable for producing asbestos-containing sheet which comprises forming a homogeneous mixture comprising:
  a. polymeric binder comprising (i) normally-solid thermoplastic vinyl chloride/vinyl $C_2$–$C_4$ alkanoate copolymer in which the polymerized vinyl chloride portion thereof comprises at least about 70 weight percent and the polymerized vinyl $C_2$–$C_4$ alkanoate portion thereof comprises up to about 30 weight percent; and (ii) normally-solid thermoplastic vinyl chloride/vinyl $C_2$–$C_4$ alkanoate/$C_2$–$C_4$ alkene terpolymer in which the polymerized vinyl chloride portion thereof comprises the major portion by weight;
  b. a filler; and
  c. a plasticizer;
  d. said polymeric binder comprising from about 25 to about 65 weight percent of said copolymer, and from about 35 to about 75 weight percent of said terpolymer;
  e. said filler comprising from about 200 to about 750 parts by weight per 100 parts by weight of said polymeric binder;
  f. said homogeneous mixture being formed at a temperature of from about 250° to about 375°F; and
  g. thereafter milling and calendering said homogeneous mixture into fused plasticized vinyl sheets.

72. The process of claim 71 wherein said polymeric binder also contains from about 0.5 to about 15 weight percent of a normally-solid thermoplastic alkanoyl polymer having a reduced viscosity value of at least about 0.1 and which is further characterized in that at least about 50 weight percent of said thermoplastic oxyalkanoyl polymer is attributable to recurring oxyalkanoyl units of the formula

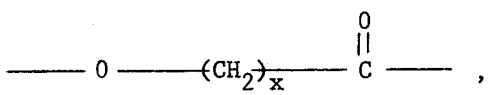

wherein $x$ is an integer having a value of 2 to 7, with the proviso that $x$ does not equal 3.

73. The process of claim 72 wherein said mixture also comprises a small amount of a hindered phenol.

* * * * *

UNITED STATES PATENT OFFICE
CERTIFICATE OF CORRECTION

Patent No. 3,904,579            Dated September 9, 1975

Inventor(s) Robert P. Braddicks

It is certified that error appears in the above-identified patent and that said Letters Patent are hereby corrected as shown below:

Column 2, line 18, omit the repeated "to" which precedes the word "These".

Column 2, line 51, the word "compositions" should read "composition".

Column 2, line 55, the word "this" should read "the".

Column 2, line 64, the word "linees" should read "lines".

Column 4, line 63, the word "or" was omitted preceding the word "all".

Column 4, line 67 the word "incuding" should read "including".

Column 4, line 50, the word "at" was omitted preceding the word "least".

Column 5, line 46, the word "as" was omitted preceding the word "high".

Column 6, line 49, "R'" should read "R".

Column 7, lines 51 and 52, the word "epsiloncaprolactone" should read "epsilon-caprolactone".

Column 8, lines 7 and 8, the words "di-n-butylzinc" and "tri-n-butylaluminum", in both instances the "n" should be underscored.

Column 8, line 8, "n-butylaluminum", "n" should be underscored.

UNITED STATES PATENT OFFICE
CERTIFICATE OF CORRECTION

Patent No. 3,904,579   Dated September 9, 1975

Inventor(s) Robert P. Braddicks

It is certified that error appears in the above-identified patent and that said Letters Patent are hereby corrected as shown below:

(cont'd page 2)

Column 8, line 46, "poly(oxylalkanoyl)" should read poly(oxyalkanoyl)".

Column 8, line 64 insert word "which" before the word "can".

Column 9, line 22, "epsiloncaprolactone" should read "epsilon-caprolactone".

Column 9, line 28 "isocyanatocyalohexyl" should read "isocyanatocyclohexyl".

Column 11, line 49, "thiodiproionate" should read "thiodipropionate".

Column 15, line 30 "board y" should read "boardy".

Column 15, line 39, "board y" should read "boardy".

Column 16, line 29, "untile" should read "until".

Column 17, line 59, "-g-ood" should read "good".

Column 19, line 2 "tongue" should read "torque".

Column 19, line 4, "tongue" should read "torque".

Column 19, Table IX, Footnote 5 has been repeated.

Column 20, line 10, "22 24 and 27" should read "22,24 and 27".

UNITED STATES PATENT OFFICE
CERTIFICATE OF CORRECTION

Patent No. 3,904,579         Dated September 9, 1975

Inventor(s) Robert P. Braddicks

It is certified that error appears in the above-identified patent and that said Letters Patent are hereby corrected as shown below:

Column 22, subheading 26 of Table XI, "47..6" should read "47.6".

Column 23 and 24 "17 18 19, 20 21 22 23 24 25" should read " 26 27 28 29 30".

Column 30, line 1, "dentation" should read "indentation".

Signed and Sealed this seventeenth Day of February 1976

[SEAL]

Attest:

RUTH C. MASON
Attesting Officer

C. MARSHALL DANN
Commissioner of Patents and Trademarks